(12) United States Patent
Kim

(10) Patent No.: US 9,619,142 B2
(45) Date of Patent: Apr. 11, 2017

(54) METHOD FOR EDITING DISPLAY INFORMATION AND AN ELECTRONIC DEVICE THEREOF

(71) Applicant: Samsung Electronics Co., Ltd., Suwon-si, Gyeonggi-do (KR)

(72) Inventor: Hyoung-Sik Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 14/184,193

(22) Filed: Feb. 19, 2014

(65) Prior Publication Data

US 2014/0237404 A1    Aug. 21, 2014

(30) Foreign Application Priority Data

Feb. 21, 2013   (KR) .................. 10-2013-0018622

(51) Int. Cl.
```
G06F 3/033      (2013.01)
G06F 3/0488     (2013.01)
G06F 3/0484     (2013.01)
```
(52) U.S. Cl.
CPC ...... *G06F 3/04883* (2013.01); *G06F 3/04842* (2013.01)

(58) Field of Classification Search
CPC ... G06F 3/0488; G06F 3/048883; G06F 9/543

USPC ............... 715/765, 769, 863; 345/173
See application file for complete search history.

(56) References Cited

U.S. PATENT DOCUMENTS

| | | | | |
|---|---|---|---|---|
| 6,331,840 B1* | 12/2001 | Nielson | ................. | G06F 3/0488 715/769 |
| 7,030,861 B1* | 4/2006 | Westerman | ......... | G06F 3/04883 345/173 |
| 8,077,157 B2* | 12/2011 | Sengupta | ............ | G06F 3/04883 345/173 |
| 2010/0090971 A1* | 4/2010 | Choi | ................... | G06F 3/04883 715/863 |
| 2011/0304651 A1* | 12/2011 | Shimura | ................. | A63F 13/10 345/661 |
| 2013/0238744 A1* | 9/2013 | Paschke | .................. | G06F 9/543 709/216 |

FOREIGN PATENT DOCUMENTS

KR    10-2009-0056506 A    6/2009

* cited by examiner

*Primary Examiner* — Haoshian Shih
(74) *Attorney, Agent, or Firm* — Jefferson IP Law, LLP

(57) ABSTRACT

An apparatus and a method for editing display information in an electronic device with a touch screen are provided. The method includes, when a first editing event occurs when a first touch is held, determining a service status of the electronic device and storing an object of a first touch point and service status information.

22 Claims, 32 Drawing Sheets

METHOD FOR EDITING DISPLAY INFORMATION AND AN ELECTRONIC DEVICE THEREOF

CROSS-REFERENCE TO RELATED APPLICATION(S)

This application claims the benefit under 35 U.S.C. §119(a) of a Korean patent application filed on Feb. 21, 2013 in the Korean Intellectual Property Office and assigned Serial number 10-2013-0018622, the entire disclosure of which is hereby incorporated by reference.

TECHNICAL FIELD

The present disclosure relates to a method for editing display information and an electronic device thereof.

BACKGROUND

As the use of a multimedia service using a portable electronic device increases, information quantity having to be processed in the portable electronic device and information quantity having to be displayed are increasing. Accordingly, demand continues to grow for a portable electronic device with a touch screen capable of improving a space utility and increasing the size of a display unit.

A touch screen is an input/output device for performing information input and output in one screen. Accordingly, if a portable electronic device uses the touch screen, the portable electronic device can increase a display area by removing a separate input device, such as a keypad, and the like.

In a case of a portable electronic device using the touch screen as above, the electronic device does not have a separate input device, such as a keypad, so its handling method gets different from that of an electronic device having a separate input device. Further, the electronic device with the touch screen can display more information through a screen expanded through the touch screen, than the electronic device of the related art without the touch screen. Accordingly, the electronic device with the touch screen needs a separate user interface based on the touch screen.

Therefore, a need exists for an apparatus and a method for editing display information in an electronic device with a touch screen.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for editing display information in an electronic device with a touch screen.

Another aspect of the present disclosure is to provide an apparatus and a method for providing cropping and pasting services for display information in an electronic device with a touch screen.

Another aspect of the present disclosure is to provide an apparatus and a method for editing display information according to a cropping method in an electronic device with a touch screen.

Another aspect of the present disclosure is to provide an apparatus and a method for storing cropping characteristic information about display information in an electronic device with a touch screen.

Another aspect of the present disclosure is to provide an apparatus and a method for arranging cropping information based on a service characteristic in an electronic device with a touch screen.

Another aspect of the present disclosure is to provide an apparatus and a method for transmitting cropping information to a server in an electronic device with a touch screen.

Another aspect of the present disclosure is to provide an apparatus and a method for receiving cropping information from a server in an electronic device with a touch screen.

Another aspect of the present disclosure is to provide an apparatus and a method for arranging cropping information received from a server based on a service characteristic in an electronic device with a touch screen.

The above aspects are achieved by providing an apparatus and a method for editing display information in an electronic device.

In accordance with an aspect of the present disclosure, a method for editing an object displayed on a display unit in an electronic device is provided. The method includes, when a first editing event occurs when a first touch is held, determining a service status of the electronic device, and storing an object of a first touch point and service status information.

In accordance with another aspect of the present disclosure, a method for editing an object displayed on a display unit in an electronic device is provided. The method includes determining if at least one object for a pasting service exists, when the at least one object exists, determining a service status of the electronic device, arranging the at least one object according to the service status of the electronic device, and displaying on the display unit the arranged at least one object.

In accordance with another aspect of the present disclosure, an electronic device is provided. The electronic device includes a touch screen configured to detect a presence and a location of a touch, at least one processor configured to execute computer programs, and a memory configured to store data, instructions, and a program driven by the at least one processor. When a first editing event takes place when a first touch is held, the program determines a service status of the electronic device, and stores an object of a first touch point and service status information.

In accordance with another aspect of the present disclosure, an electronic device is provided. The electronic device includes a touch screen configured to detect a presence and a location of a touch, at least one processor configured to execute computer programs, and a memory configured to store data, instructions, and a program driven by the at least one processor. The program controls to determine if at least one object for a pasting service exists, when the at least one object exists, determine a service status of the electronic device, arrange the at least one object according to the service status of the electronic device, and display on the touch screen the arranged at least one object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
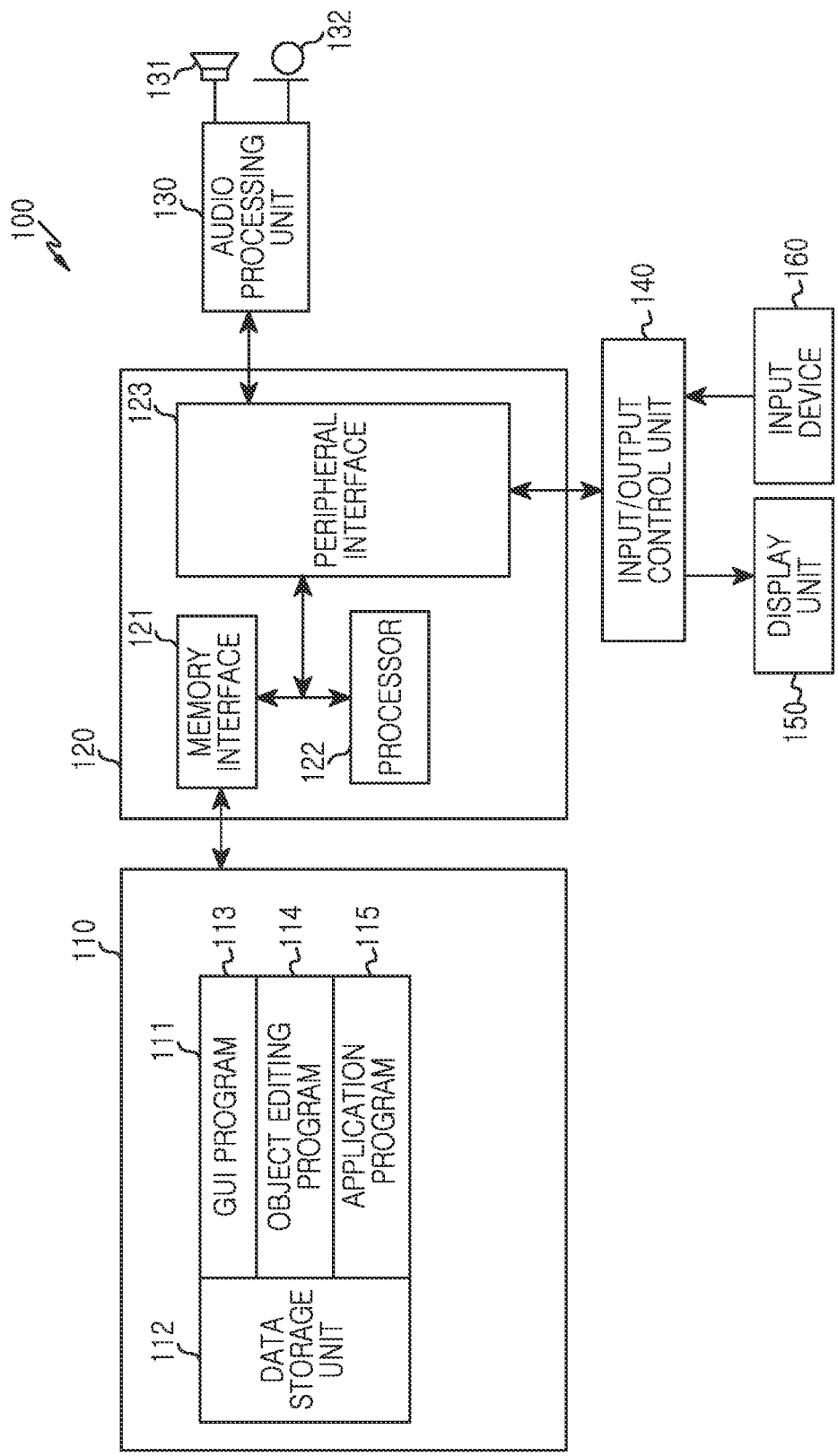
FIG. 1 is a block diagram illustrating a construction of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The present disclosure describes a method for editing display information in an electronic device with a touch screen. Here, the display information is information displayed on a display unit which provides a service provision in the electronic device. The display information includes objects constructing a picture displayed on the display unit which provides a graphical interface between the electronic device and a user.

In the following description, the object may include at least one of an application program menu, an icon, a widget, a text, a playlist, an image, and the like.

In the following description, the electronic device may include one or more of a mobile communication terminal with a touch screen, a Personal Digital Assistant (PDA), a laptop computer, a smartphone, a netbook, a television, a Mobile Internet Device (MID), an Ultra Mobile Personal Computer (UMPC), a tablet PC, a navigator, a Moving Picture Experts Group (MPEG-1 or MPEG-2) Audio layer 3 (MP3) player, and the like.

In the following description, information may include, though not limited to, a value, a parameter, a coefficient, a component, and the like.

In the following description, it is assumed that the electronic device performs cropping and pasting editing of display information. However, the electronic device can identically perform other editing methods, such as moving and copying of the display information, and the like.

FIG. 1 is a block diagram illustrating a construction of an electronic device according to an embodiment of the present disclosure.

Referring to FIG. 1, an electronic device 100 includes a memory 110, a processor 120, an audio processing unit 130, an input/output control unit 140, a display unit 150, and an input device 160. Here, the memory 110 may exist in plural.

Each constituent element is described as follows.

The memory 110 includes a program storage unit 111 for storing a program and for controlling the operation of the electronic device 100 and a data storage unit 112 for storing data generated during program execution.

The data storage unit 112 stores cropping information and service status information of a cropping service provision time point. For example, the data storage unit 112 can store cropping information and service status information of each cropping service provision time point added to the cropping information. In another example, the data storage unit 112 may store metadata which includes cropping information and service status information about each cropping information. For example, the data storage unit 112 may store a service status information table which includes at least one display information cropped through a cropping service and service status information about each display information. Here, the cropping information includes the at least one display information cropped through the cropping service. The service status information includes at least one of a touch input method of a cropping time point, a characteristic of an application program, a characteristic of a user interface, and the like.

The program storage unit 111 includes a Graphical User Interface (GUI) program 113, the object editing program 114, and at least one application program 115. Here, the program included in the program storage unit 111, a set of instructions, may be expressed as an instruction set.

The GUI program 113 includes at least one software constituent element for providing a graphical user interface to the display unit 150. For example, the GUI program 113 can control the display unit 150 to display information of an application program driven by the processor 122. In another example, the GUI program 113 can control to present an animation effect to an object edited by the object editing program 114. More specifically, the GUI program 113 can control to present an effect in which display information for cropping is sucked into a touch pen or a finger. In addition, the GUI program 113 can control to present an effect in which display information for pasting is discharged from the touch pen or the finger similarly to an effect of squeezing liquid out of a tube. In another example, as illustrated in FIGS. 9A, 9B, 10A, 10B, and 10C, the GUI program 113 may control to arrange at least one object stored in the data storage unit 112 according to a service characteristic of a pasting time point and display the arranged object.

The object editing program 114 includes at least one software constituent element for editing an object. For example, if a cropping event occurs, the object editing program 114 controls to crop at least one object. At this time, the object editing program 114 can select at least one object for cropping based on object touch information illustrated in FIG. 4A or FIG. 4C and object group information illustrated in FIG. 5A or FIG. 5D. Thereafter, the object editing program 114 controls to store the cropped object and service status information of an object cropping time point in the data storage unit 112. Here, the object editing program 114 detects the occurrence of the cropping event by using at least one of input methods, such as pressing of a button of a touch pen, pressing of a hardware button of the electronic device, selecting of an icon, detecting of a motion of the electronic device, detecting of a user gesture, and the like.

In another example, if a pasting event occurs, the object editing program 114 controls to paste at least one cropped object to a touch point. At this time, as illustrated in FIGS. 9A, 9B, 10A, 10B, and 10C, the object editing program 114 can control to arrange at least one object stored in the data storage unit 112 according to a service characteristic of a pasting time point and display the arranged object. Here, the object editing program 114 detects the occurrence of the pasting event by using at least one of input methods, such as pressing of a button of a touch pen, pressing of a hardware button of the electronic device, selecting of an icon, detecting of a motion of the electronic device, detecting of a user gesture, and the like.

The application program 115 includes a software constituent element for at least one application program installed in the electronic device 100.

The processor 120 includes a memory interface 121, at least one processor 122, and a peripheral interface 123. Here, the memory interface 121, at least one processor 122, and peripheral interface 123, which are included in the processor 120, can be integrated as at least one integrated circuit or be implemented as separate constituent elements.

The memory interface 121 controls the access of a constituent element, such as the processor 122, the peripheral interface 123, and the like, to the memory 110.

The peripheral interface 123 controls the connection of the memory interface 121 and the processor 122 with an input/output peripheral device of the electronic device 100.

The processor 122 controls the electronic device 100 to provide various multimedia services using at least one software program. At this time, the processor 122 controls to execute at least one program stored in the memory 110 and provide a service corresponding to the corresponding program. For example, the processor 122 can edit display information by executing one or more of the GUI program 113 and the object editing program 114 stored in the program storage unit 111.

The audio processing unit 130 provides an audio interface between a user and the electronic device 100 through a speaker 131 and a microphone 132. For example, when an object is cropped according to a cropping method, the audio processing unit 130 can generate a sound effect as if the object is sucked through the speaker 131. In addition, when the object is pasted according to the cropping method, the audio processing unit 130 may generate a sound effect as if the object is discharged through the speaker 131.

The input/output control unit 140 provides an interface between an input/output device, such as the display unit 150, the input device 160, and the like, and the peripheral interface 123.

The display unit 150 displays status information of the electronic device 100, a character input by a user, a moving picture, a still picture, and the like. For example, the display unit 150 displays information of an application program driven by the processor 122. In another example, when the object editing program 114 performs cropping of an object, the display unit 150 can display an animation effect in which the object for cropping is sucked into a touch pen or a finger. In another example, when the object editing program 114 performs pasting of the object, the display unit 150 may display an animation effect of as if the object is discharged from the touch pen or the finger. In another example, as illustrated in FIGS. 9A, 9B, 10A, 10B, and 10C, the display unit 150 may arrange at least one object stored in the data storage unit 112 according to a service characteristic of a pasting time point and display the arranged object.

The input device 160 provides input data generated by a user's selection, to the processor 120 through the input/output control unit 140. In an embodiment of the present disclosure, the input device 160 includes a keypad including at least one hardware button, a touch pad detecting touch information, and the like. For example, the input device 160 provides touch information detected through the touch pad, to the processor 122 through the input/output control unit 140.

Figure 12:
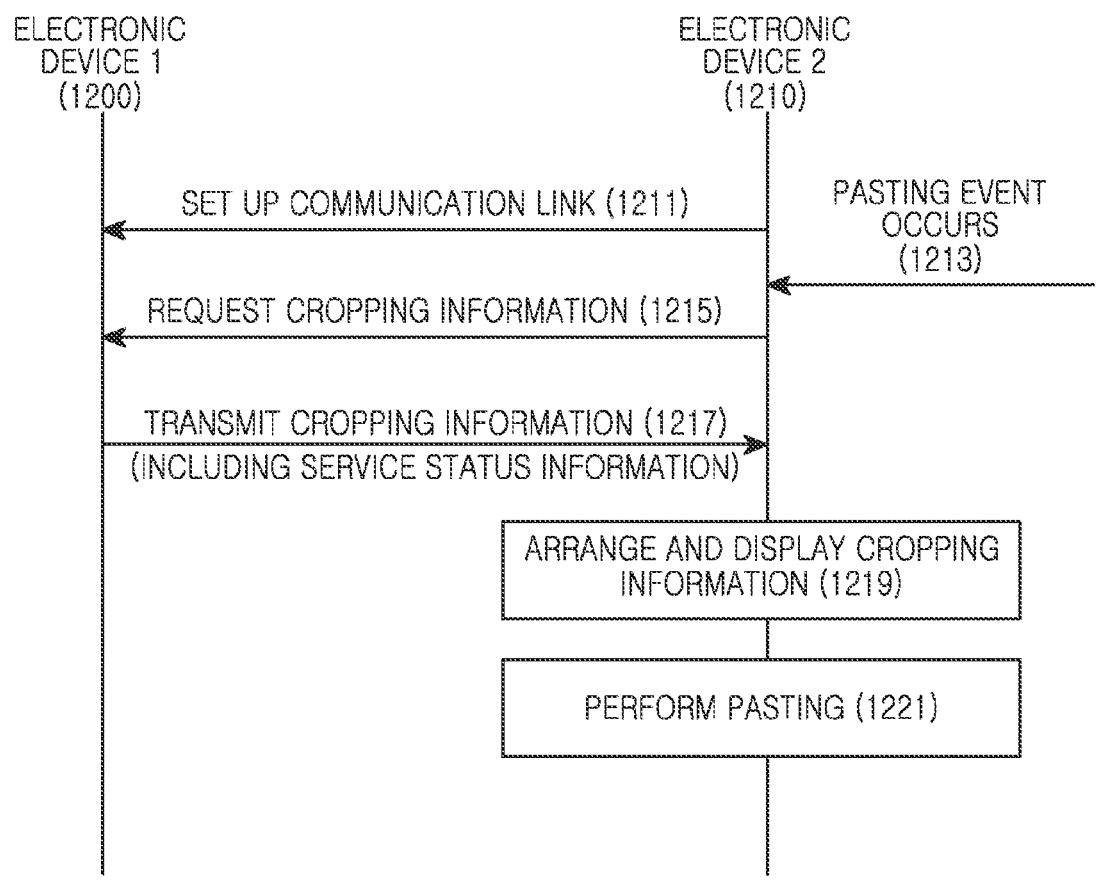
FIG. 12 is a ladder diagram illustrating a procedure for sharing cropping information according to an embodiment of the present disclosure.
Figure 14:
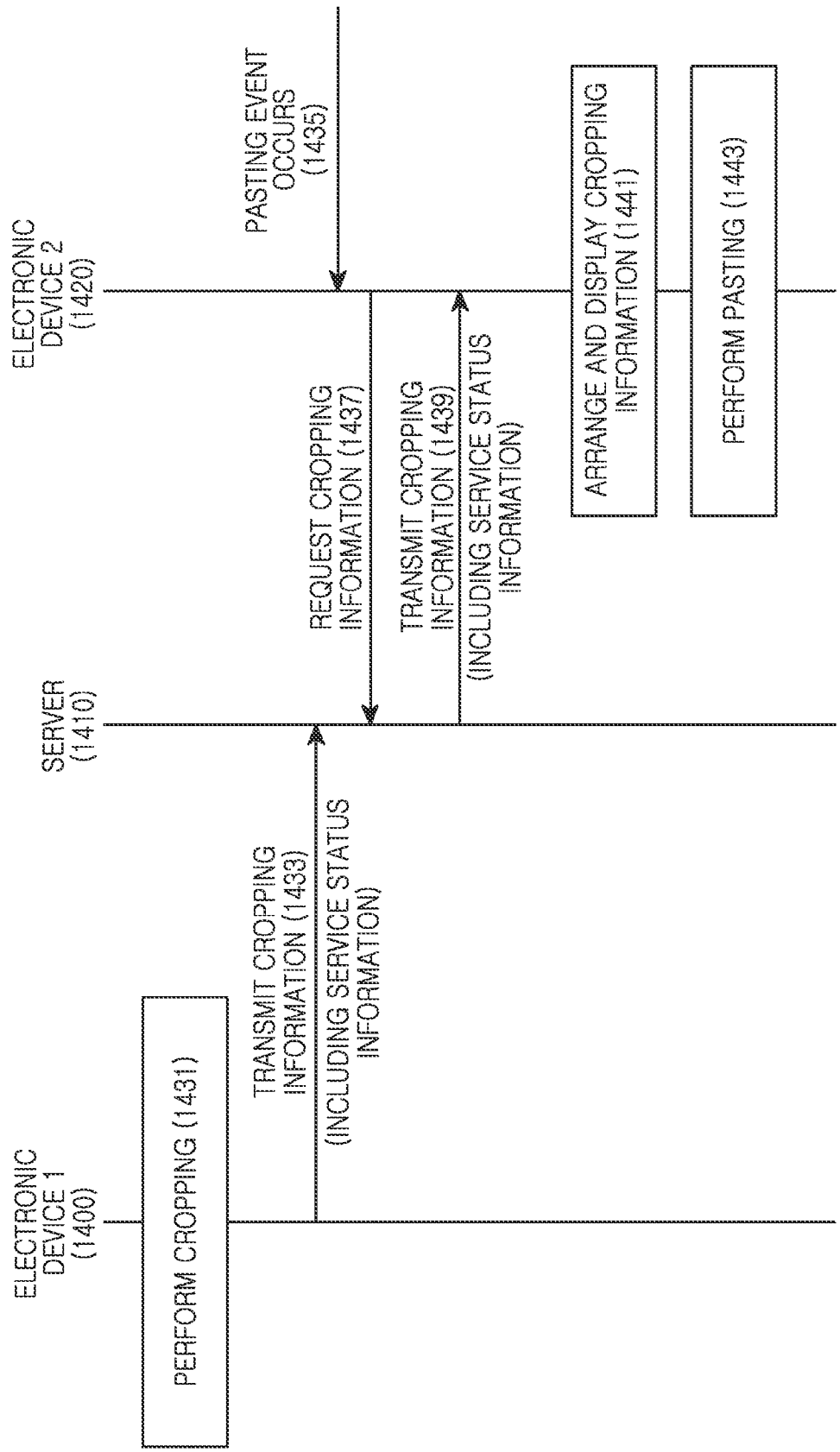
FIG. 14 is a ladder diagram illustrating a procedure for sharing cropping information according to an embodiment of the present disclosure.

Though not illustrated, the electronic device 100 may further include a communication system performing a communication function for voice communication and data communication. At this time, as illustrated in FIG. 12 or FIG. 14, the electronic device can use the communication system to transmit or receive cropping information. Here, the communication system may be divided into a plurality of communication sub modules supporting different communication networks. For example, the communication network includes, although not limited to, a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Local Area Network (WLAN), a Bluetooth network, Near Field Communication (NFC), and the like.

In the aforementioned embodiment of the present disclosure, the processor 122 may edit display information by executing software constituent elements stored in the program storage unit 111 within one module.

Figure 2:
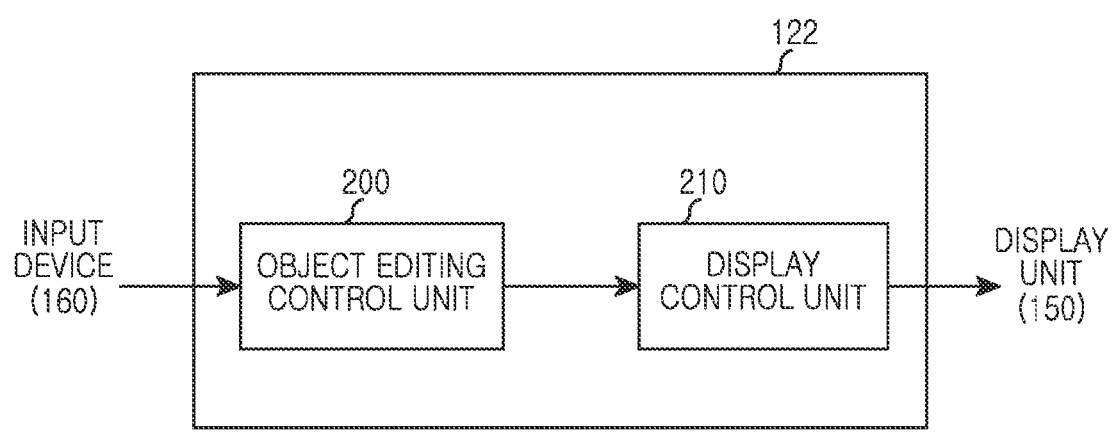
FIG. 2 is a block diagram illustrating a construction of a processor according to an embodiment of the present disclosure.

In another embodiment of the present disclosure, the processor 122 may include constituent elements for editing display information as separate modules as illustrated in FIG. 2 below.

FIG. 2 is a block diagram illustrating a construction of a processor according to an embodiment of the present disclosure.

Referring to FIG. 2, the processor 122 includes an object editing control unit 200 and a display control unit 210.

The object editing control unit 200 can edit an object. At this time, the object editing control unit 200 edits the object by executing the object editing program 114 stored in the program storage unit 111. For example, if a cropping event occurs, the object editing control unit 200 controls to crop at least one object. At this time, the object editing control unit 200 can select at least one object for cropping based on object touch information illustrated in FIG. 4A or FIG. 4C and object group information illustrated in FIG. 5A or FIG. 5D. Thereafter, the object editing control unit 200 controls to store the cropped object and service status information of an object cropping time point in the data storage unit 112. Here, the object editing control unit 200 detects the occurrence of the cropping event by using at least one of input methods, such as pressing of a button of a touch pen, pressing of a hardware button of the electronic device, selecting of an icon, detecting of a motion of the electronic device, detecting of a user gesture, and the like.

In another example, if a pasting event occurs, the object editing control unit 200 controls to paste at least one cropped object to a touch point. At this time, as illustrated in FIGS. 9A, 9B, 10A, 10B, and 10C, the object editing control unit 200 can control to arrange at least one object stored in the data storage unit 112 according to a service characteristic of a pasting time point and display the arranged object. Here, the object editing control unit 200 detects the occurrence of the pasting event by using at least one of input methods, such as pressing of a button of a touch pen, pressing of a hardware button of the electronic device, selecting of an icon, detecting of a motion of the electronic device, detecting of a user gesture, and the like.

The display control unit 210 can control to display a graphical user interface on the display unit 150. At this time, the display control unit 210 controls to display the graphical user interface on the display unit 150 by executing the GUI program 113 stored in the program storage unit 111. For example, the display control unit 210 controls to display on the display unit 150 information of an application program driven by the processor 122. In another example, when the object editing control unit 200 performs cropping of an object, the display control unit 210 controls the display unit 150 to display an animation effect of as if the object for cropping is sucked into a touch pen or a finger. In another example, when the object editing control unit 200 performs pasting of the object, the display control unit 210 may control the display unit 150 to display an animation effect of as if the object is discharged from the touch pen or the finger. In another example, as illustrated in FIGS. 9A, 9B, 10A, 10B, and 10C, under the control of the object editing control unit 200, the display control unit 210 may control to arrange at least one object stored in the data storage unit 112 according to a service characteristic of a pasting time point and display the arranged object.

Although not illustrated, the processor 122 may further include an audio control unit for controlling to generate a sound effect according to object editing of the object editing control unit 200. For example, when the object editing control unit 200 crops an object, the audio control unit controls to generate a sound effect as if the object is sucked through the speaker 131. In another example, when the object editing control unit 200 pastes the object, the audio control unit may control to generate a sound effect as if the object is discharged through the speaker 131.

In the aforementioned embodiment of the present disclosure, the electronic device edits display information using the processor 122 executing the object editing program 114 stored in the program storage unit 111.

In another embodiment of the present disclosure, the electronic device may edit display information by including a separate control module including the object editing program 114.

Figure 3:
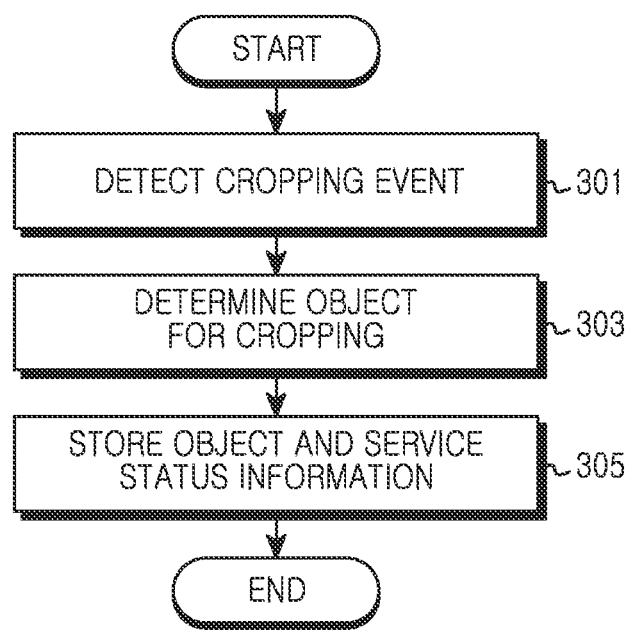
FIG. 3 is a flowchart illustrating a procedure for providing a cropping service in an electronic device according to an embodiment of the present disclosure.

FIG. 3 is a flowchart illustrating a procedure for editing display information in an electronic device according to an embodiment of the present disclosure.

Figure 4A:
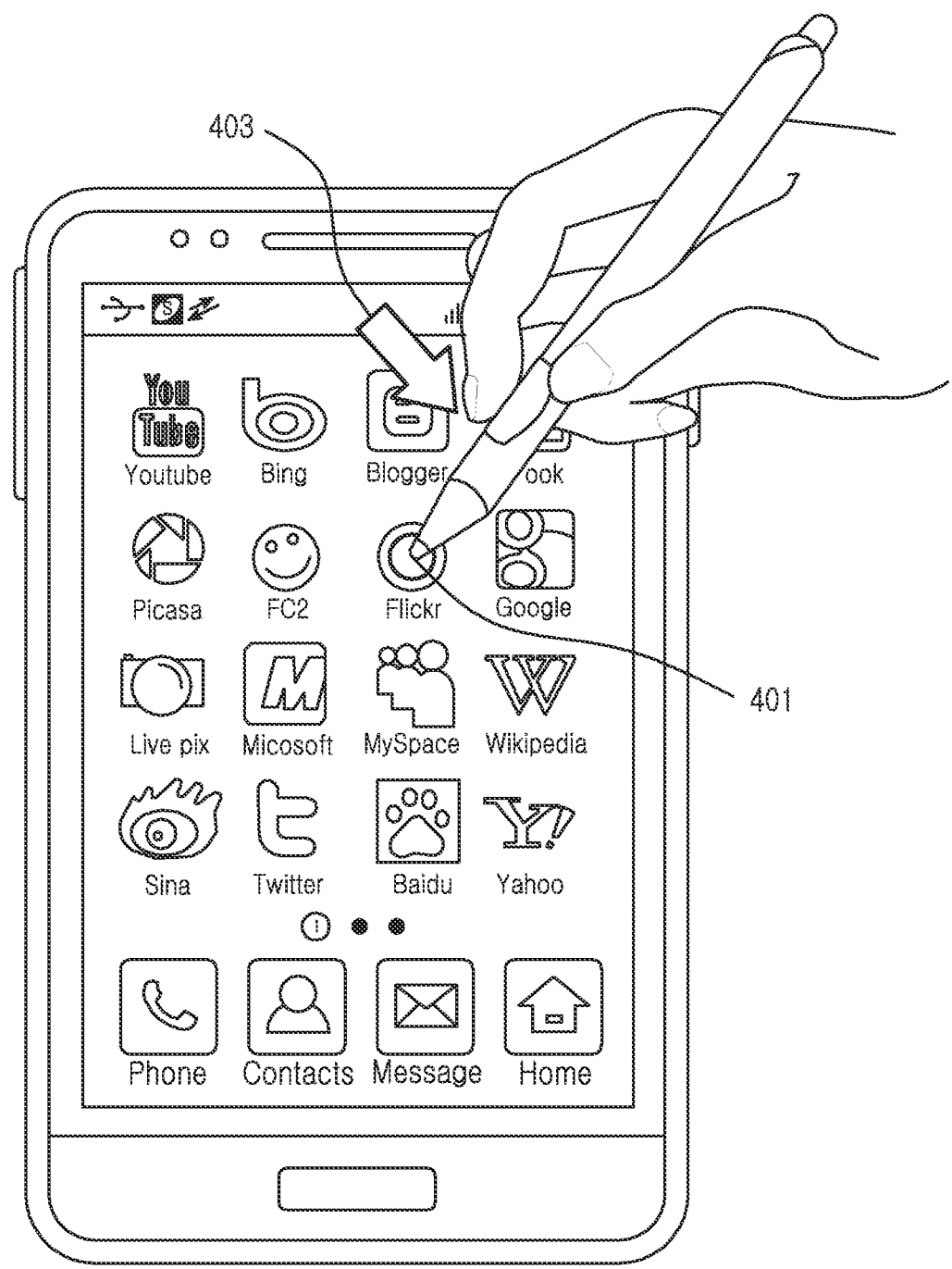
FIGS. 4A, 4B, 4C, 4D, and 4E illustrate a screen construction for providing a cropping service in an electronic device according to a first embodiment of the present disclosure.

Referring to FIG. 3, if the electronic device detects a cropping event in operation 301, the electronic device proceeds to operation 303 and determines at least one object for cropping. For example, if pressing 403 of a button of a touch pen is detected when a touch 401 to a first object is held by the touch pen as illustrated in FIG. 4A, the electronic device can recognize that the cropping event occurs. At this time, the electronic device can recognize the first object touched by the touch pen as the object for cropping. In another example, if pressing 413 of a hardware button of the electronic device is detected when a touch 411 to a first object is held by a user's finger as illustrated in FIG. 4C, the electronic device can recognize that the cropping event occurs. At this time, the electronic device can recognize the first object touched by the finger as the object for cropping.

After determining the object for cropping, the electronic device proceeds to operation 305 and crops the at least one object determined in operation 303 and stores the at least one cropped object together with service status information. For example, the electronic device can store object information and service status information of each cropping service provision time point added to the object information, in the data storage unit 112. In another example, the electronic device may store metadata which includes cropped object information and service status information about an object, in the data storage unit 112. For example, the electronic device may store a service status information table which includes at least one object cropped through a cropping service and service status information of each object cropping time point, in the data storage unit 112.

In the aforementioned embodiment of the present disclosure, the electronic device crops the object touched by the touch pen or the finger.

FIGS. 4A, 4B, 4C, 4D, and 4E illustrate a screen construction for providing a cropping service in an electronic device according to a first embodiment of the present disclosure.

Figure 4B:
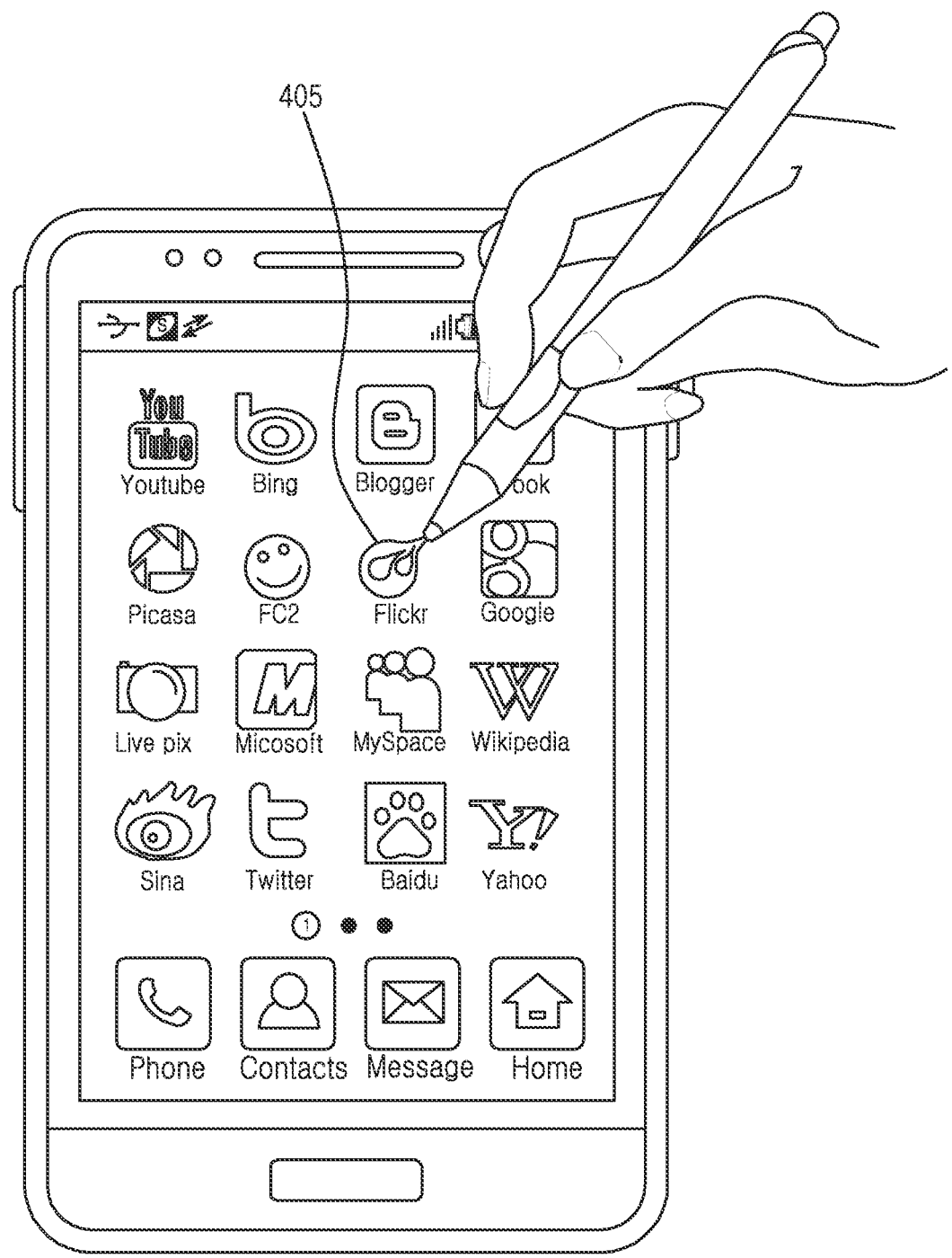
Figure 4C:
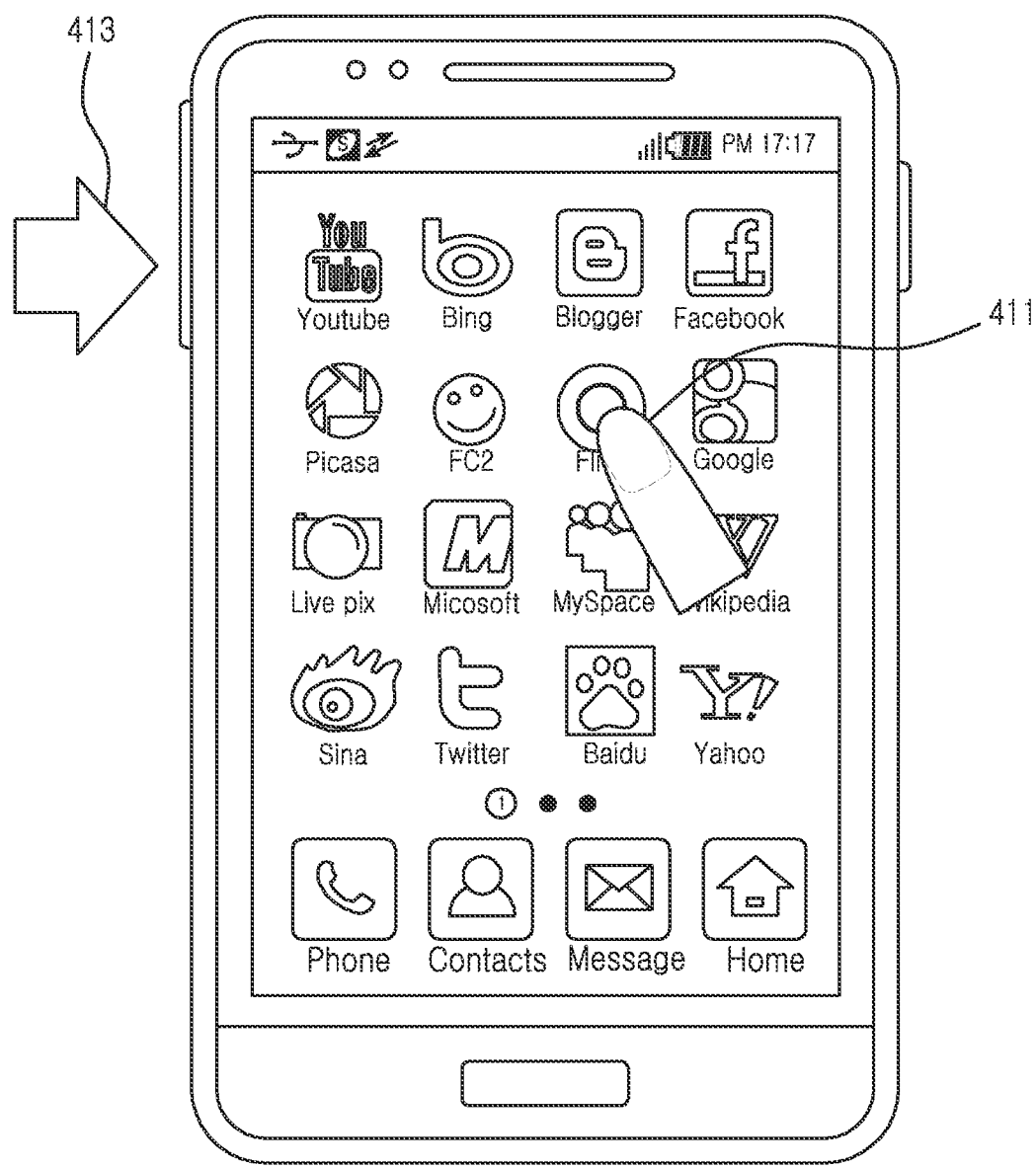
Figure 4D:
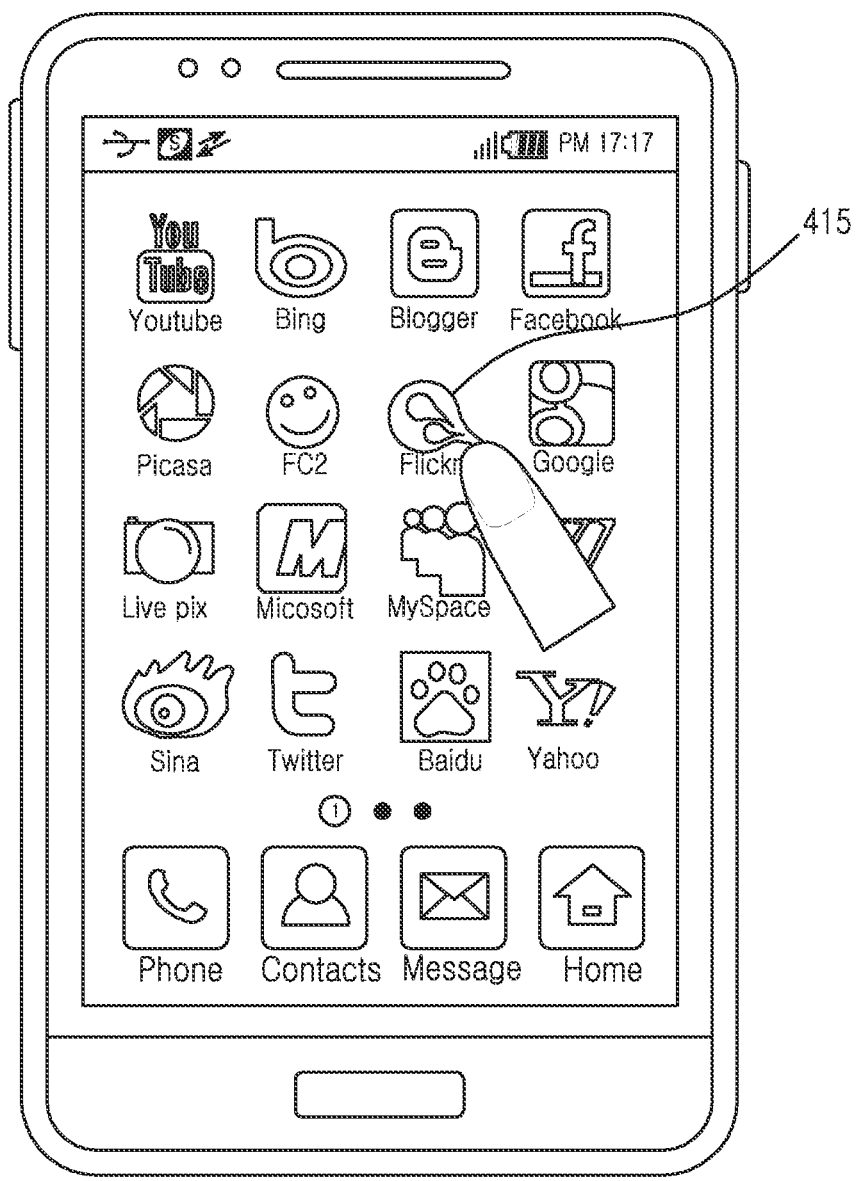
Figure 4E:

Referring to FIGS. 4A, 4B, 4C, 4D, and 4E, for example, when cropping the first object touched by the touch pen in FIG. 4A, the electronic device can crop the first object by producing an animation editing effect 405 in which the first object is sucked into the touch pen as illustrated in FIG. 4B. In another example, when cropping the first object touched by the finger in FIG. 4C, the electronic device can crop the first object by producing an animation editing effect 415 in which the first object is sucked into the finger as illustrated in FIG. 4D. Additionally, when the electronic device has at least one cropped object, the electronic device can display a notification icon 421 indicating the existence or non-existence of cropping information as illustrated in FIG. 4E. At this time, the notification icon 421 may represent the number of cropping information stored in the data storage unit 112.

In another embodiment of the present disclosure, the electronic device can crop a plurality of objects.

FIGS. 5A, 5B, 5C, 5D, 5E, and 5F illustrate a screen construction for providing a cropping service in an electronic device according to a second embodiment of the present disclosure.

Figure 5A:
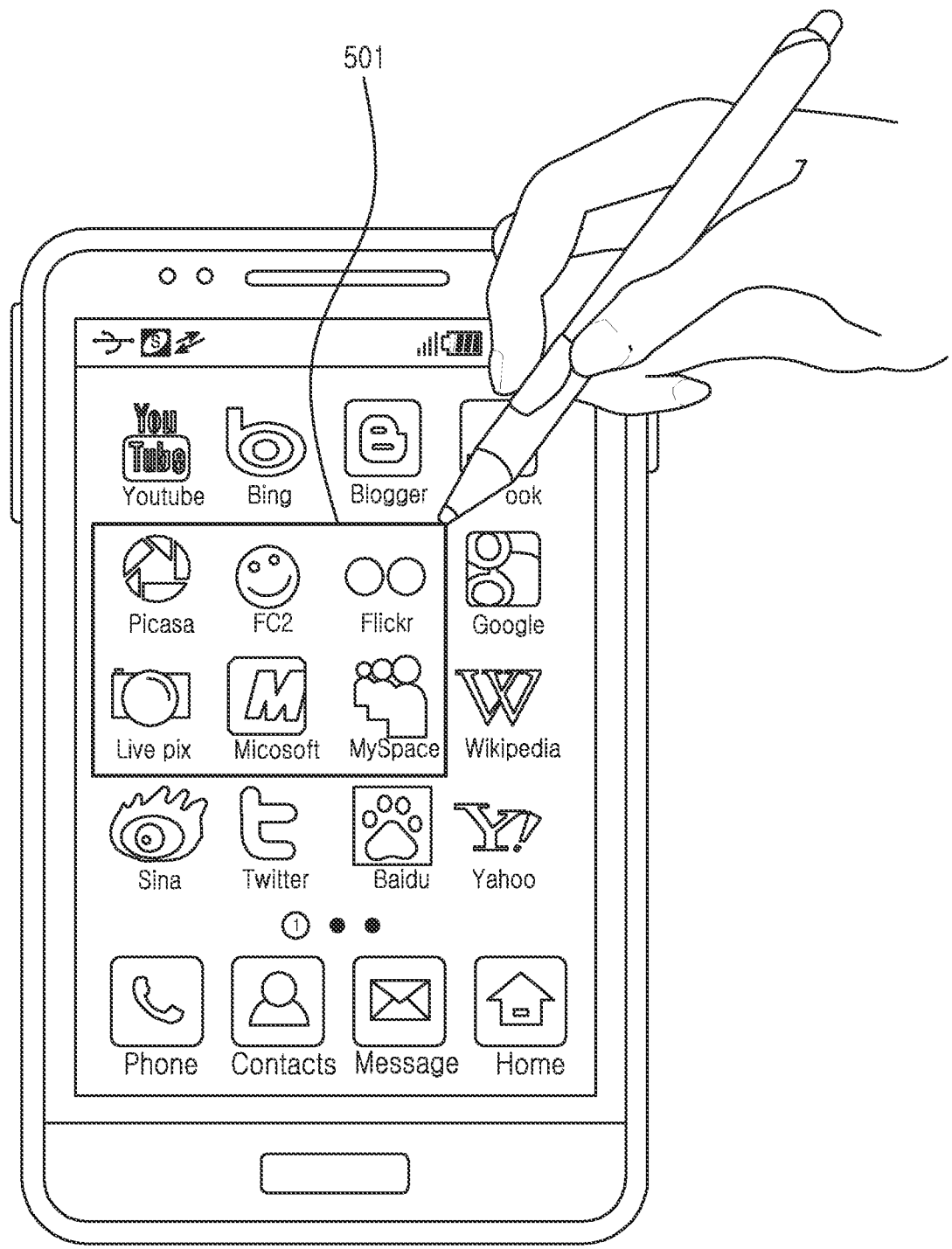
FIGS. 5A, 5B, 5C, 5D, 5E, and 5F illustrate a screen construction for providing a cropping service in an electronic device according to a second embodiment of the present disclosure.
Figure 5B:
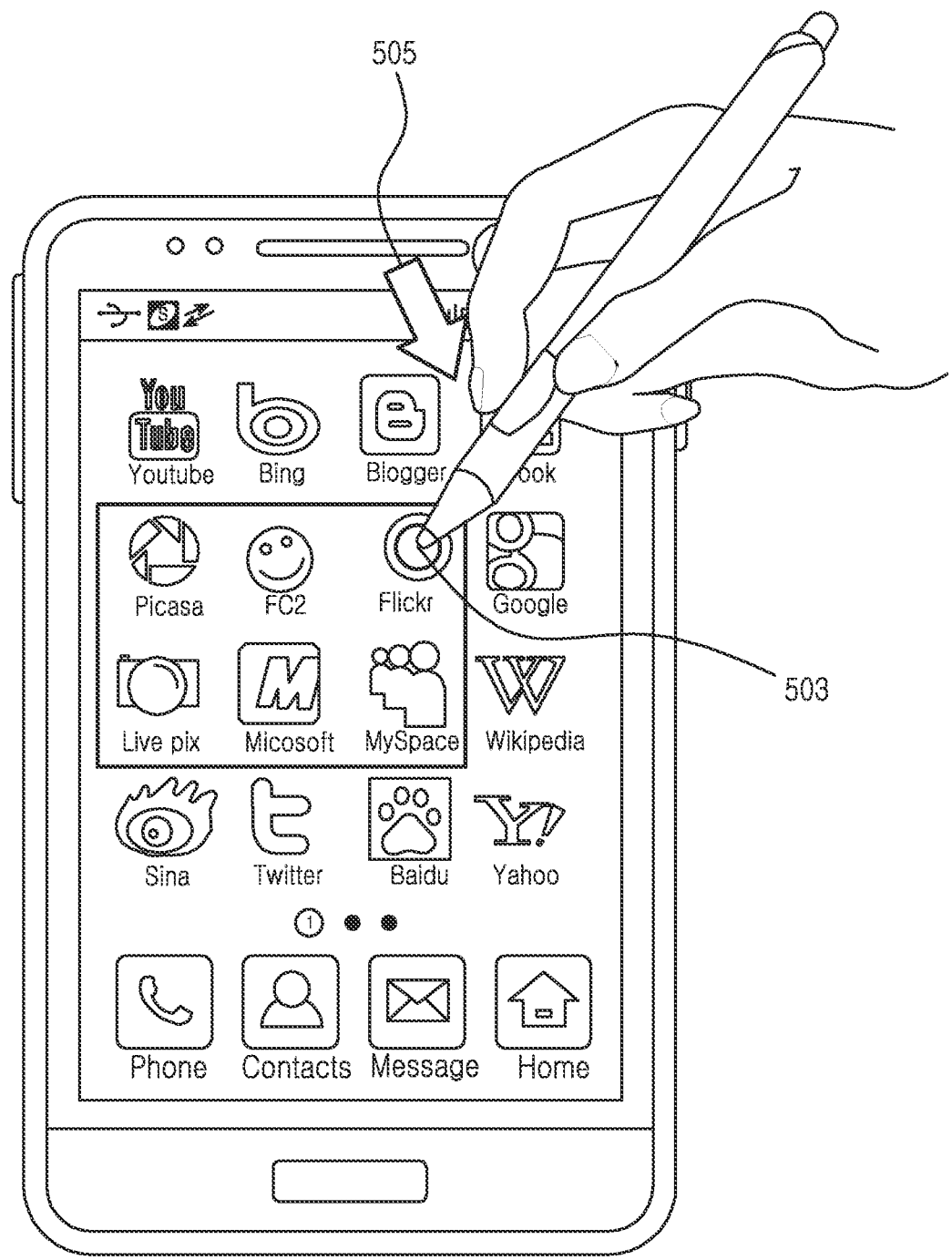
Figure 5C:
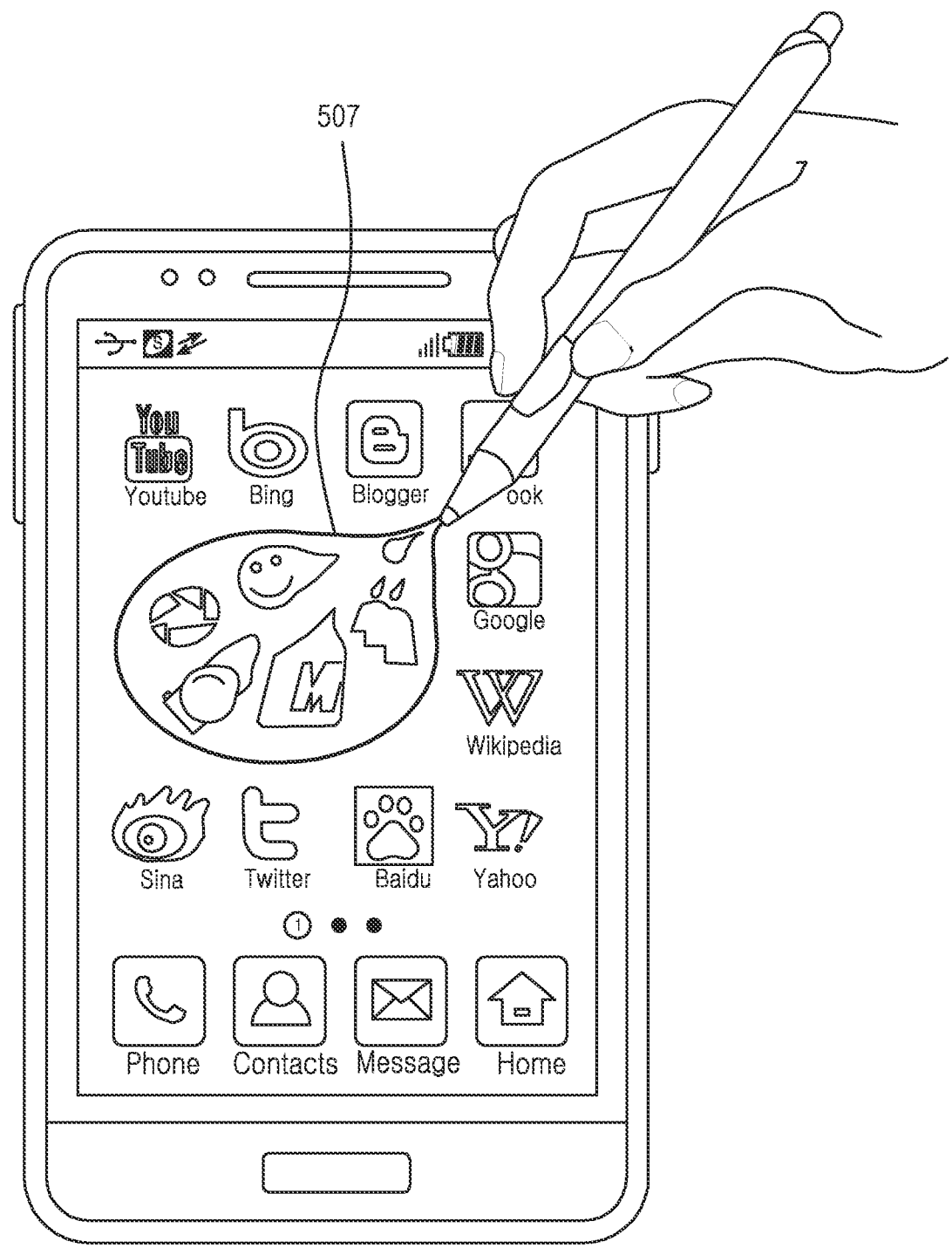
Figure 5D:
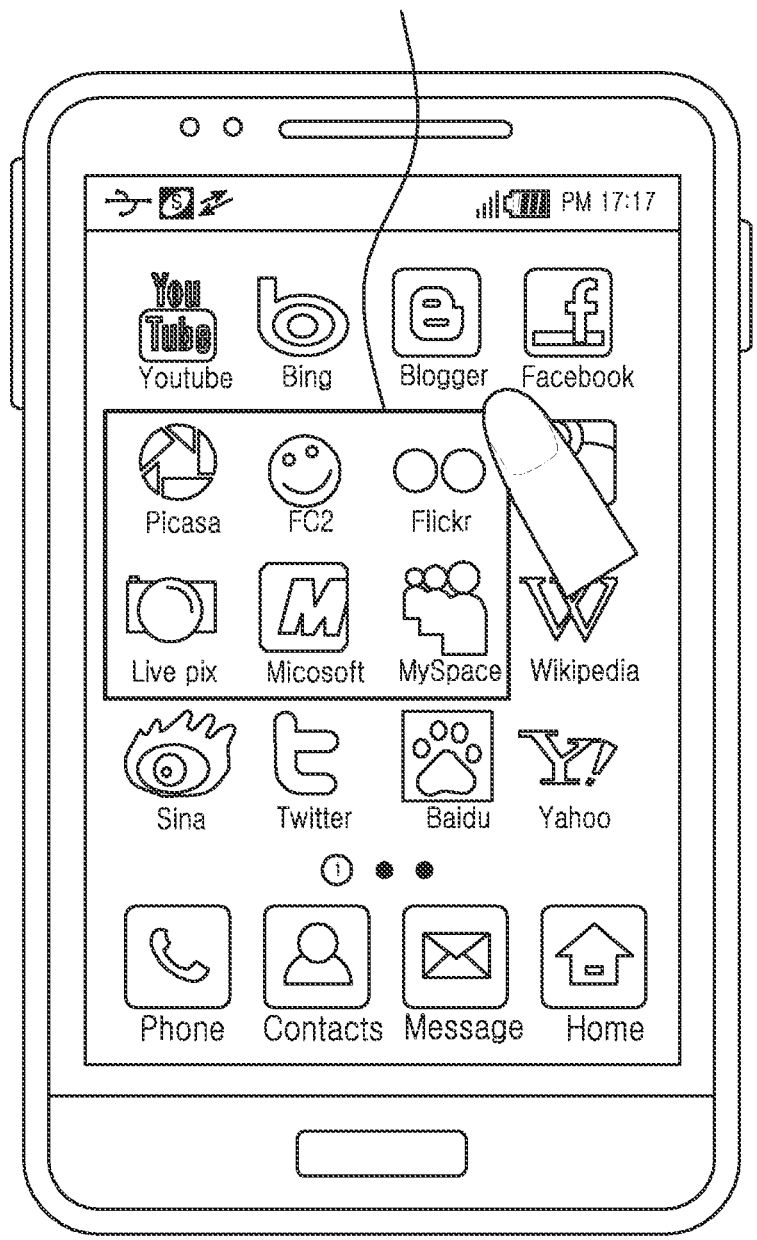
Figure 5E:
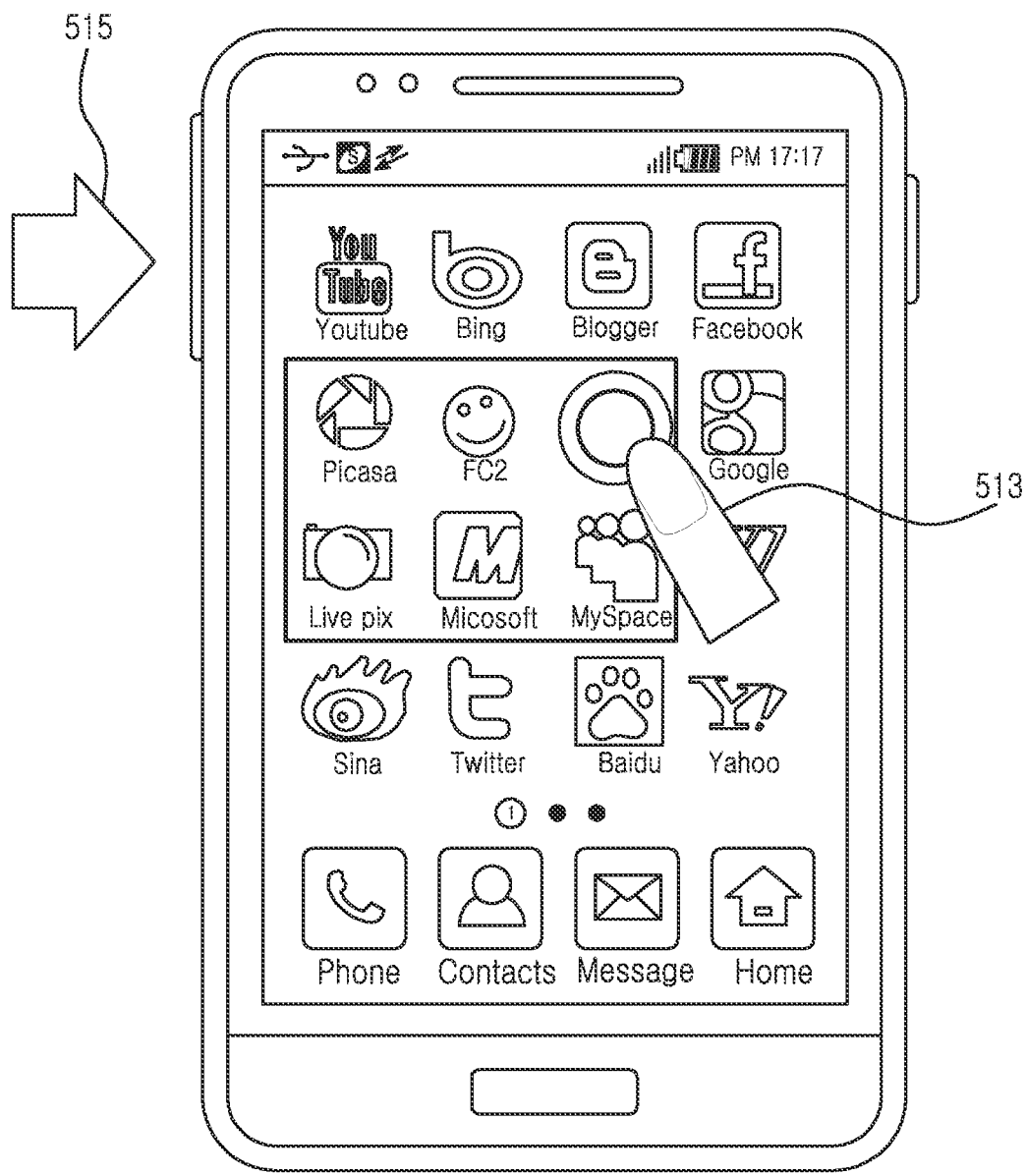
Figure 5F:
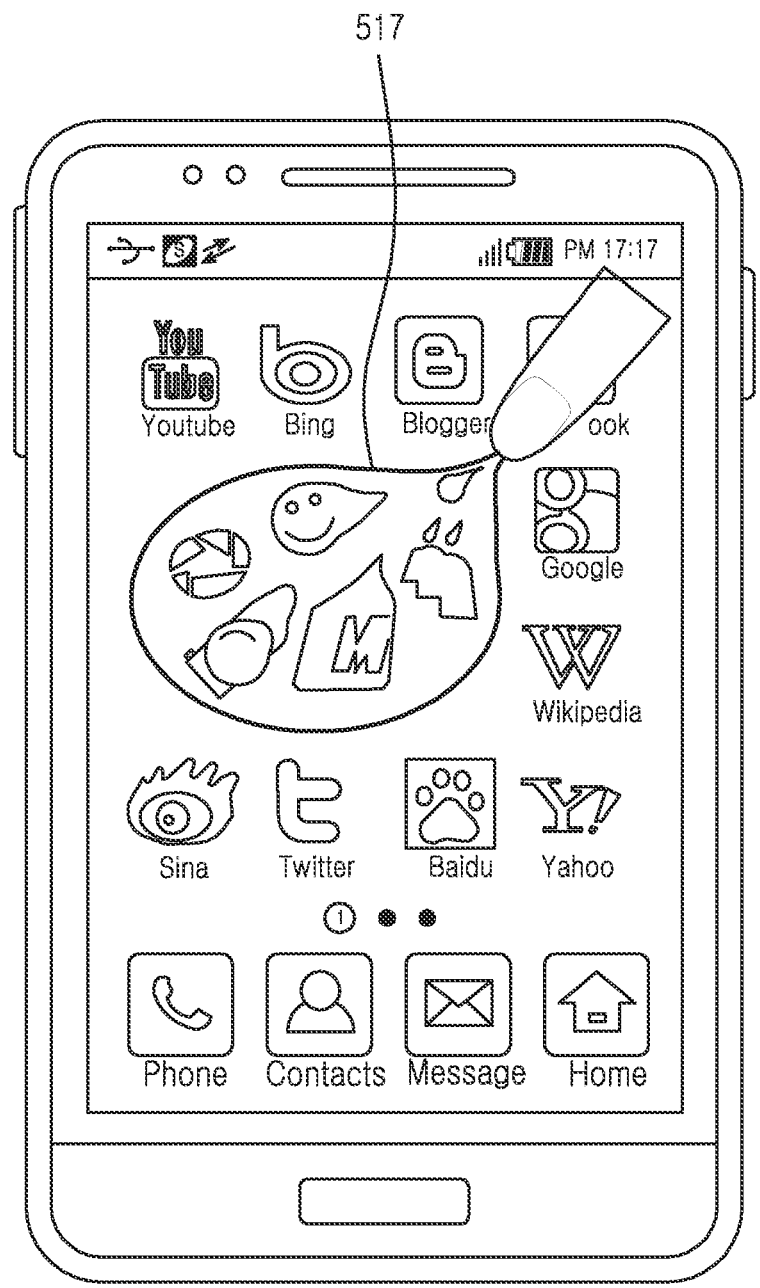

Referring to FIGS. 5A, 5B, 5C, 5D, 5E, and 5F, for example, as illustrated in FIG. 5A, the electronic device sets up an object group 501 based on touch information of a touch pen. Thereafter, if pressing 505 of a button of the touch pen is detected when a touch 503 to an object (e.g., "Flickr") included in the object group 501 is held by the touch pen as illustrated in FIG. 5B, the electronic device can crop a "Picasa" icon, an "FC2" icon, a "Flickr" icon, a "Line pix" icon, a "Microsoft" icon, and a "MySpace" icon that are included in the object group 501. At this time, the electronic device can crop the objects included in the object group 501 by producing an animation editing effect 507 of as if the objects included in the object group 501 are sucked into the touch pen from a time point at which the pressing 505 of the button of the touch pen is released as illustrated in FIG. 5C. In another example, as illustrated in FIG. 5D, the electronic device sets up an object group 511 based on touch information of a finger. Thereafter, if pressing 515 of a hardware button of the electronic device is detected when a touch 513 to an object (e.g., "Flickr") included in the object group 511 is held by the finger as illustrated in FIG. 5E, the electronic device can crop a "Picasa" icon, an "FC2" icon, a "Flickr" icon, a "Line pix" icon, a "Microsoft" icon, and a "MySpace" icon that are included in the object group 511. At this time, the electronic device can crop the objects included in the object group 511 by producing an animation editing effect 517 of as if the objects included in the object group 511 are sucked into the finger from a time point at which the pressing 515 of the hardware button of the electronic device is released as illustrated in FIG. 5F.

Figure 6:
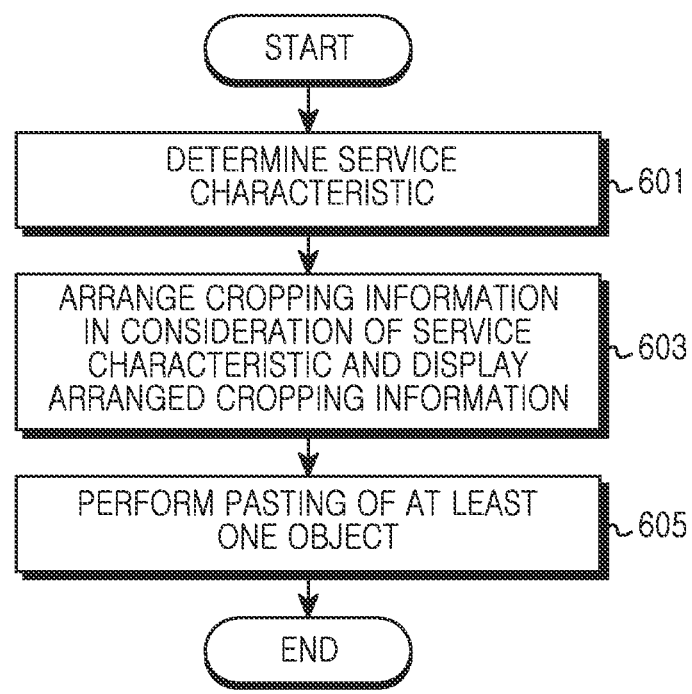
FIG. 6 is a flowchart illustrating a procedure for providing a cropping service in an electronic device according to an embodiment of the present disclosure.

FIG. 6 is a flowchart illustrating a procedure for providing a pasting service in an electronic device according to an embodiment of the present disclosure.

Referring to FIG. 6, the electronic device proceeds to operation 601 and determines a service characteristic of the electronic device. For example, when cropping information has been stored in the data storage unit 112, the electronic device determines a service characteristic of the electronic device including at least one of a touch input method, a characteristic of an application program being in execution, a characteristic of a user interface displayed on the display unit 150, and the like.

Figure 9A:
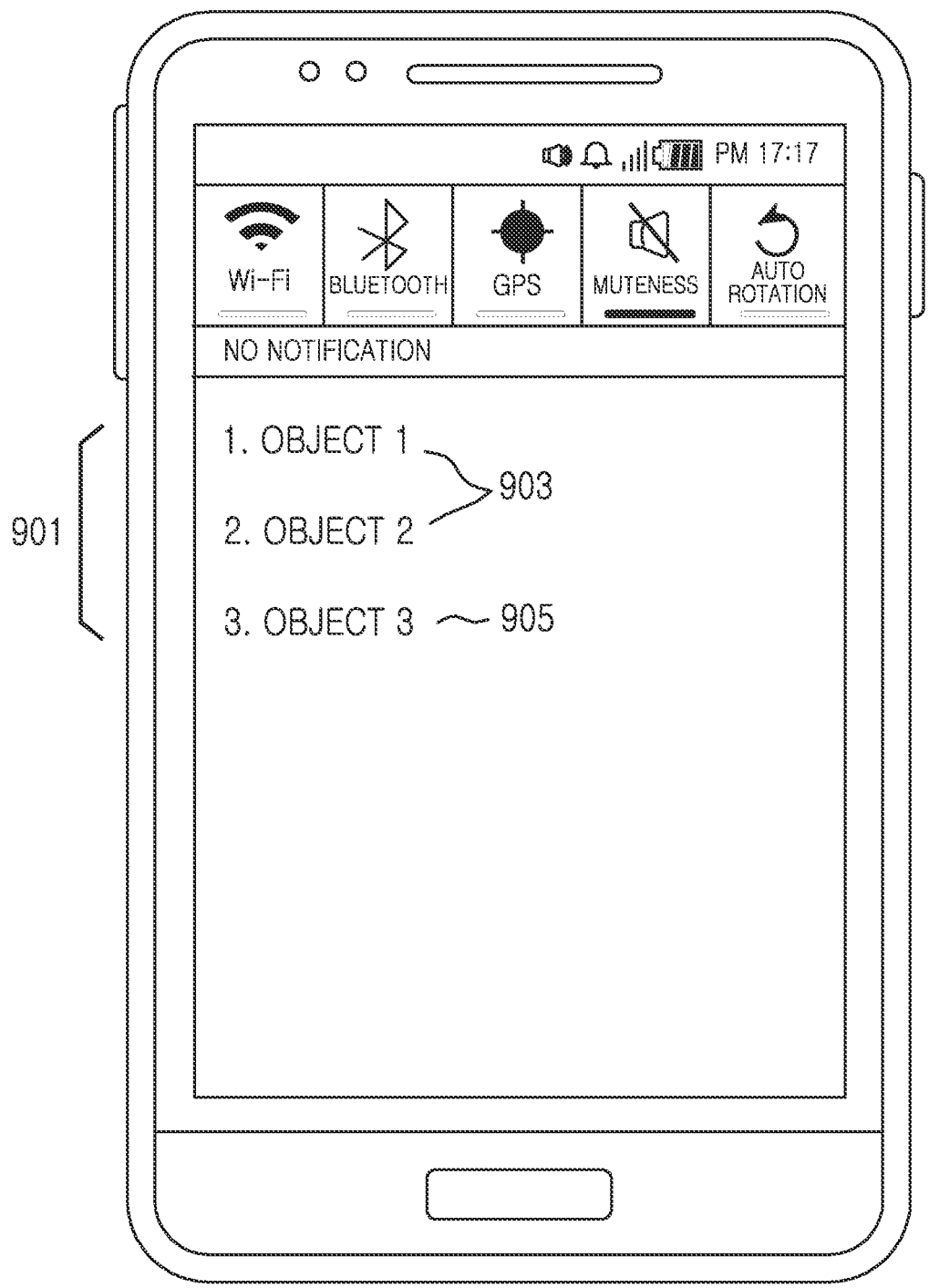
FIGS. 9A and 9B illustrate a screen construction for displaying cropping information in an electronic device according to an embodiment of the present disclosure.
Figure 9B:
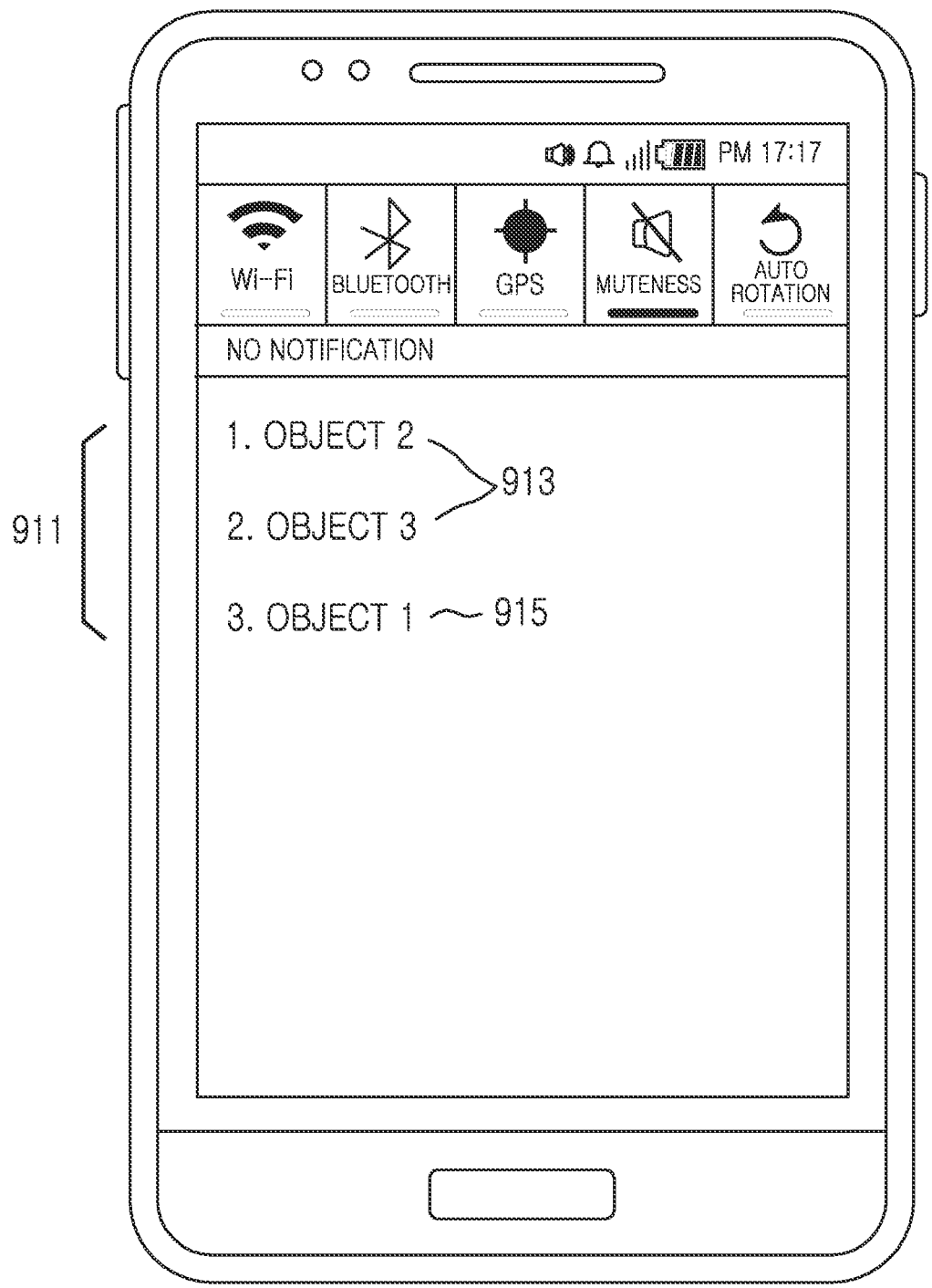
Figure 10A:
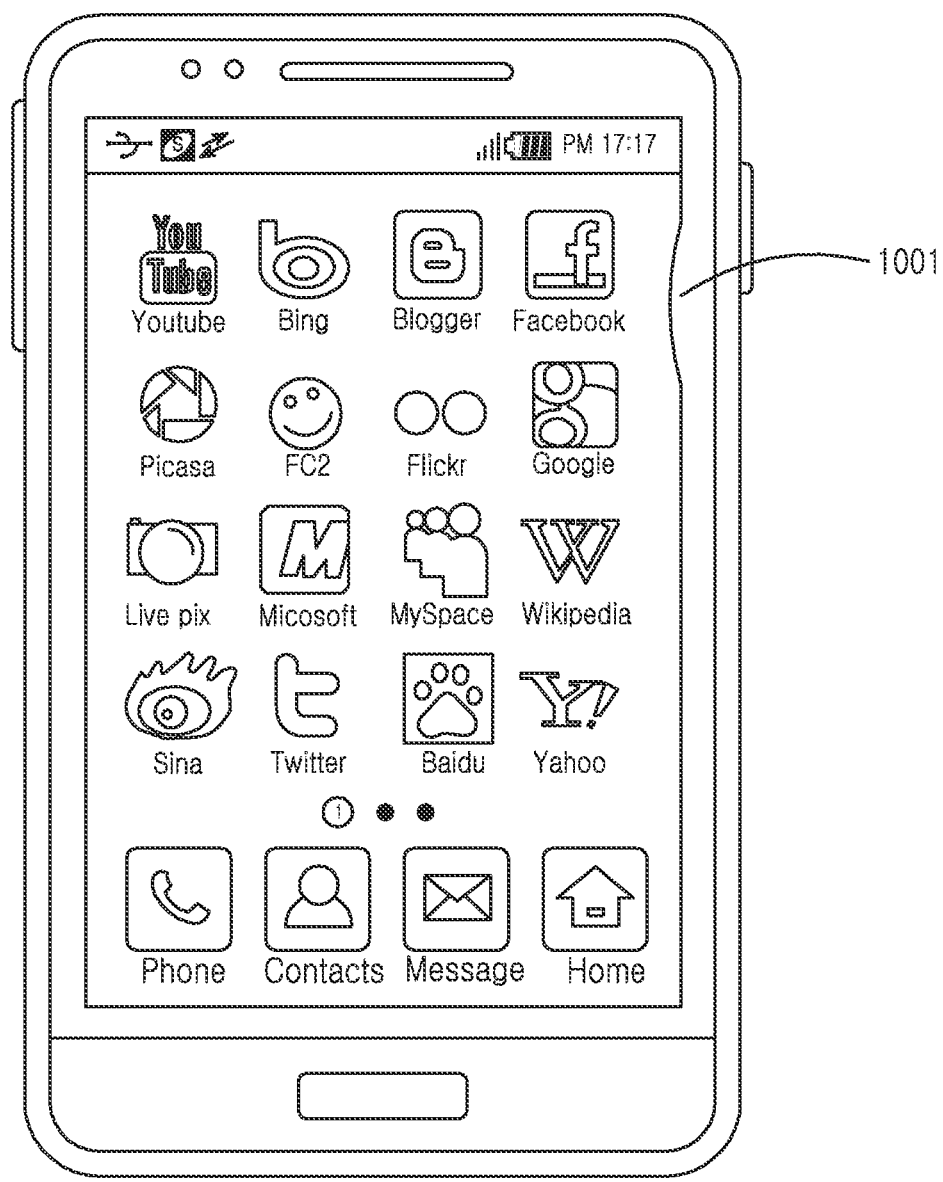
FIGS. 10A, 10B, and 10C illustrate a screen construction for displaying cropping information in an electronic device according to an embodiment of the present disclosure.
Figure 10B:
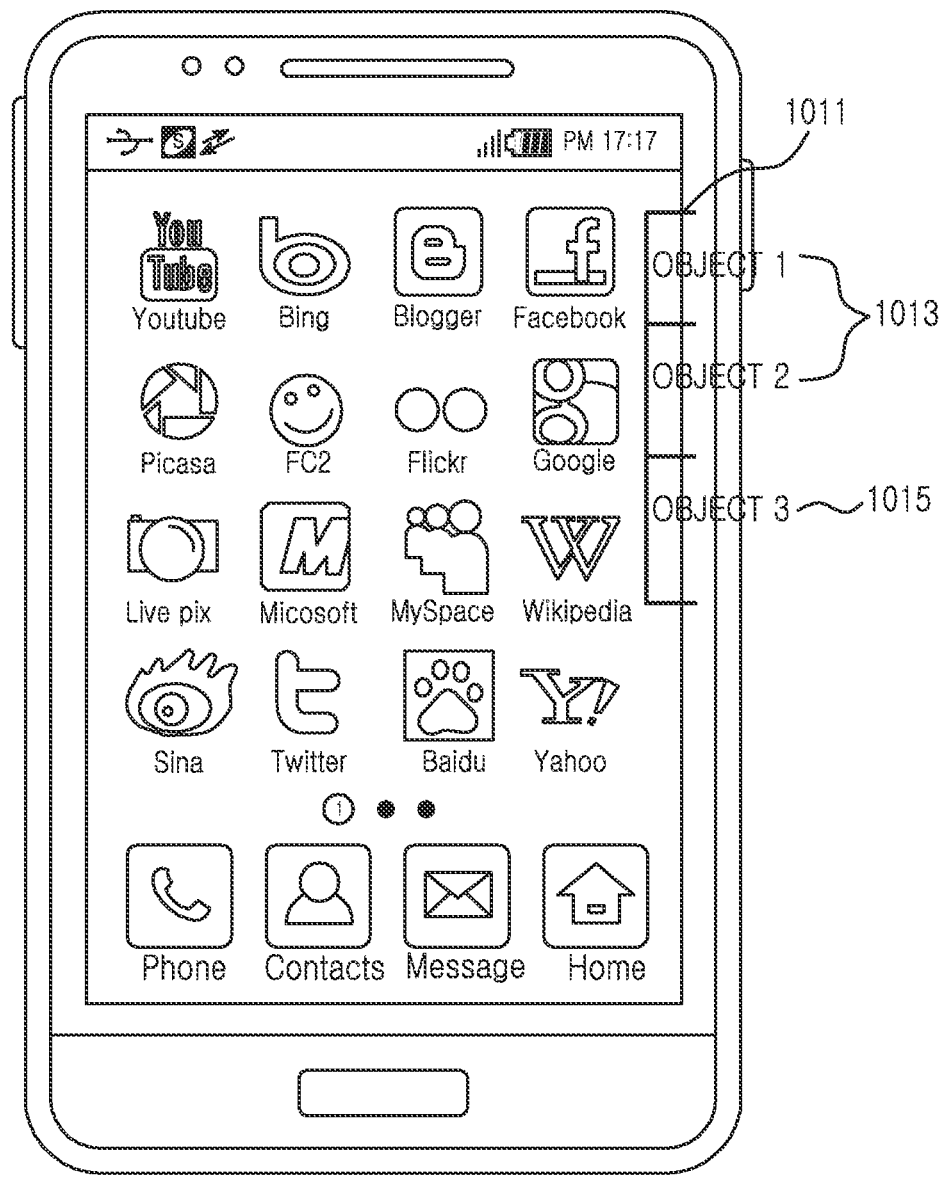
Figure 10C:
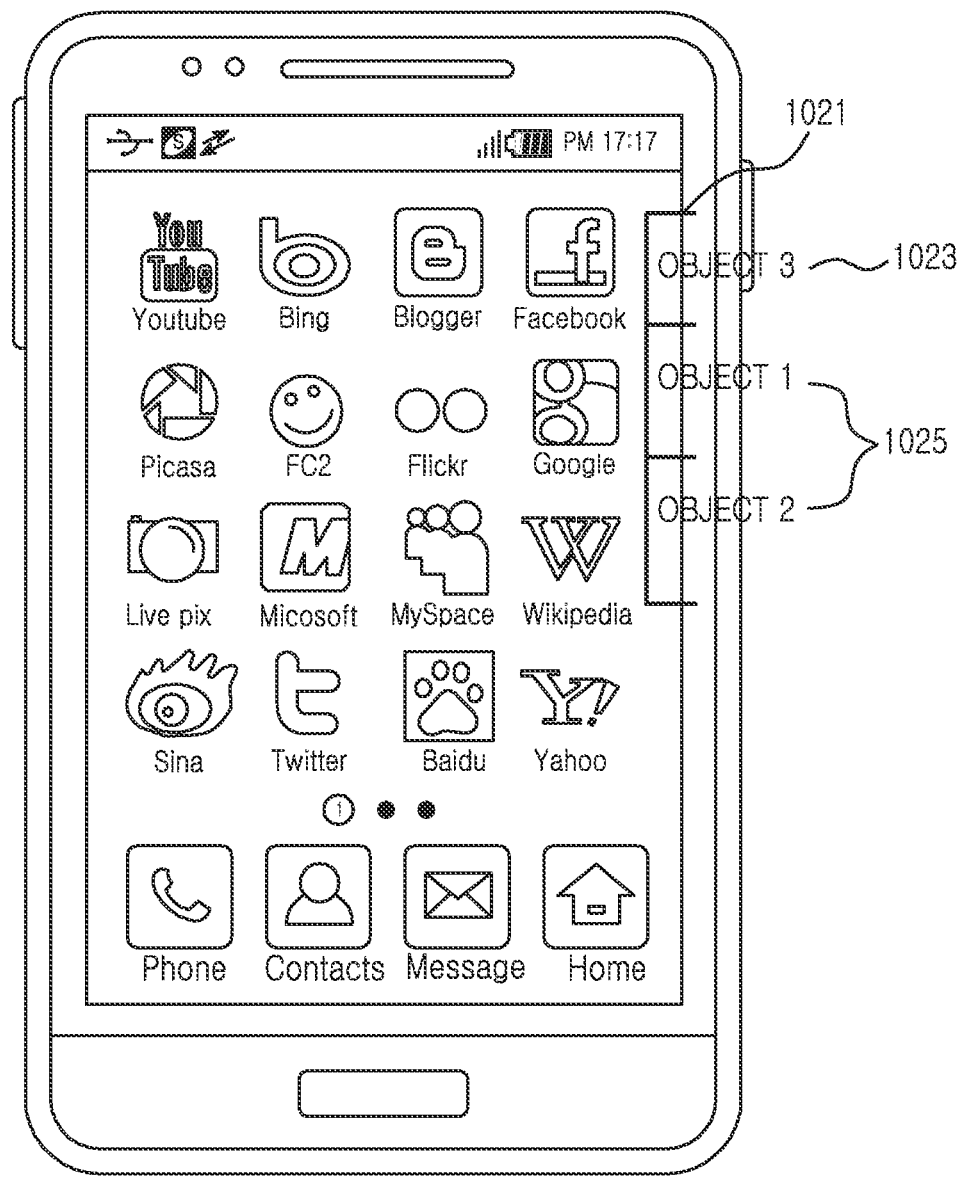

Thereafter, the electronic device proceeds to operation 603 and arranges at least one cropping information stored in the data storage unit 112 according to the service characteristic of the electronic device and displays the arranged cropping information on the display unit 150. For example, as illustrated in FIG. 9A or FIG. 9B, the electronic device can display at least one cropping information stored in the data storage unit 112 using a notification bar. At this time, as illustrated in FIG. 9A or FIG. 9B, the electronic device can arrange (901 or 911) at least one cropping information according to the service characteristic of the electronic device and display the arranged cropping information on the display unit 150. In another example, if pressing of a cropping information display button 1001 displayed in a partial region of the display unit 150 is detected as illustrated in FIG. 10A, the electronic device can display at least one cropping information stored in the data storage unit 112 as illustrated in FIG. 10B or FIG. 10C. At this time, as illustrated in FIG. 10B or FIG. 10C, the electronic device can arrange (1011 or 1021) at least one cropping information according to the service characteristic of the electronic device and display the arranged cropping information on the display unit 150.

Figure 11A:
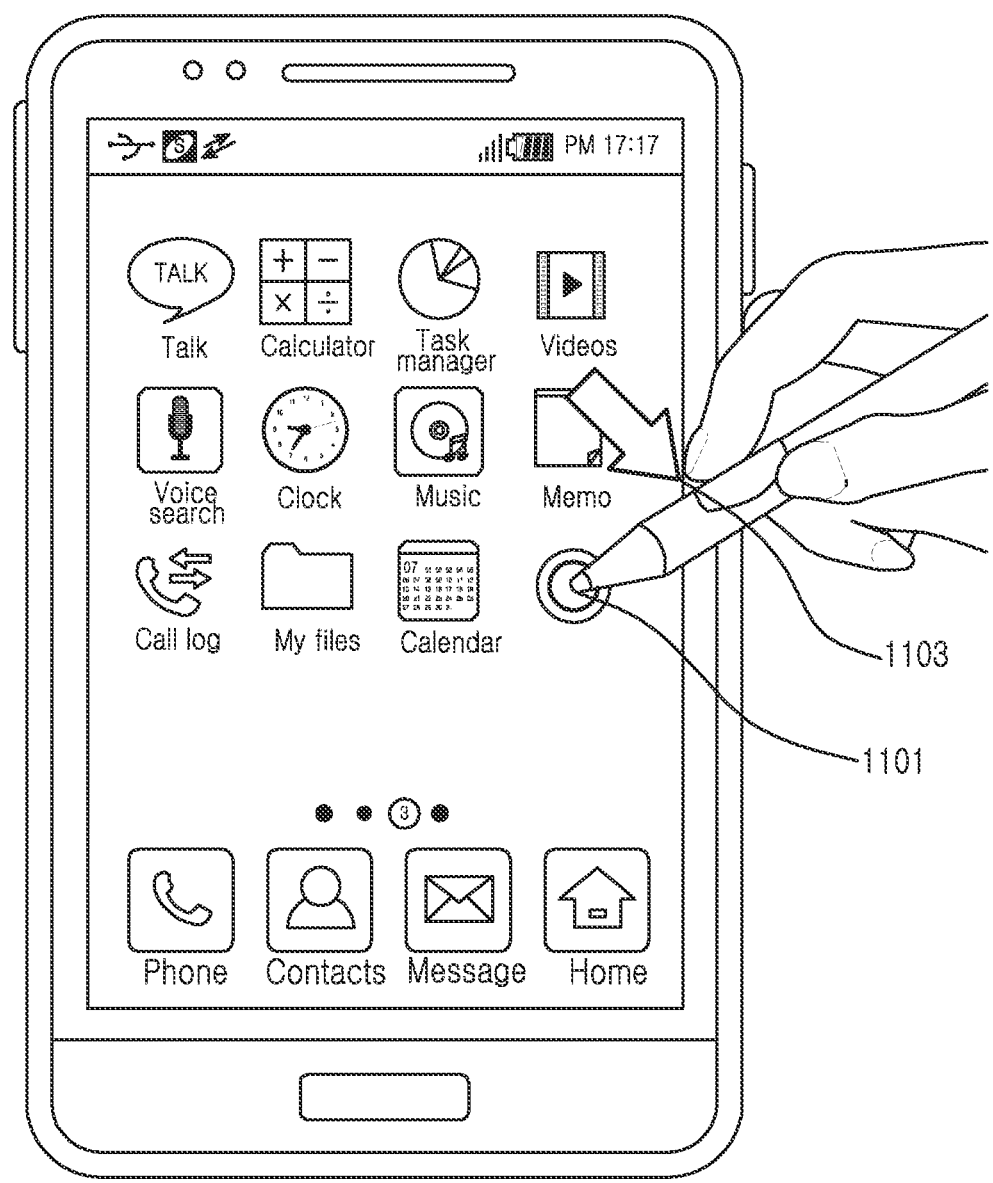
FIGS. 11A, 11B, 11C, and 11D illustrate a screen construction for providing a pasting service in an electronic device according to an embodiment of the present disclosure.
Figure 11B:
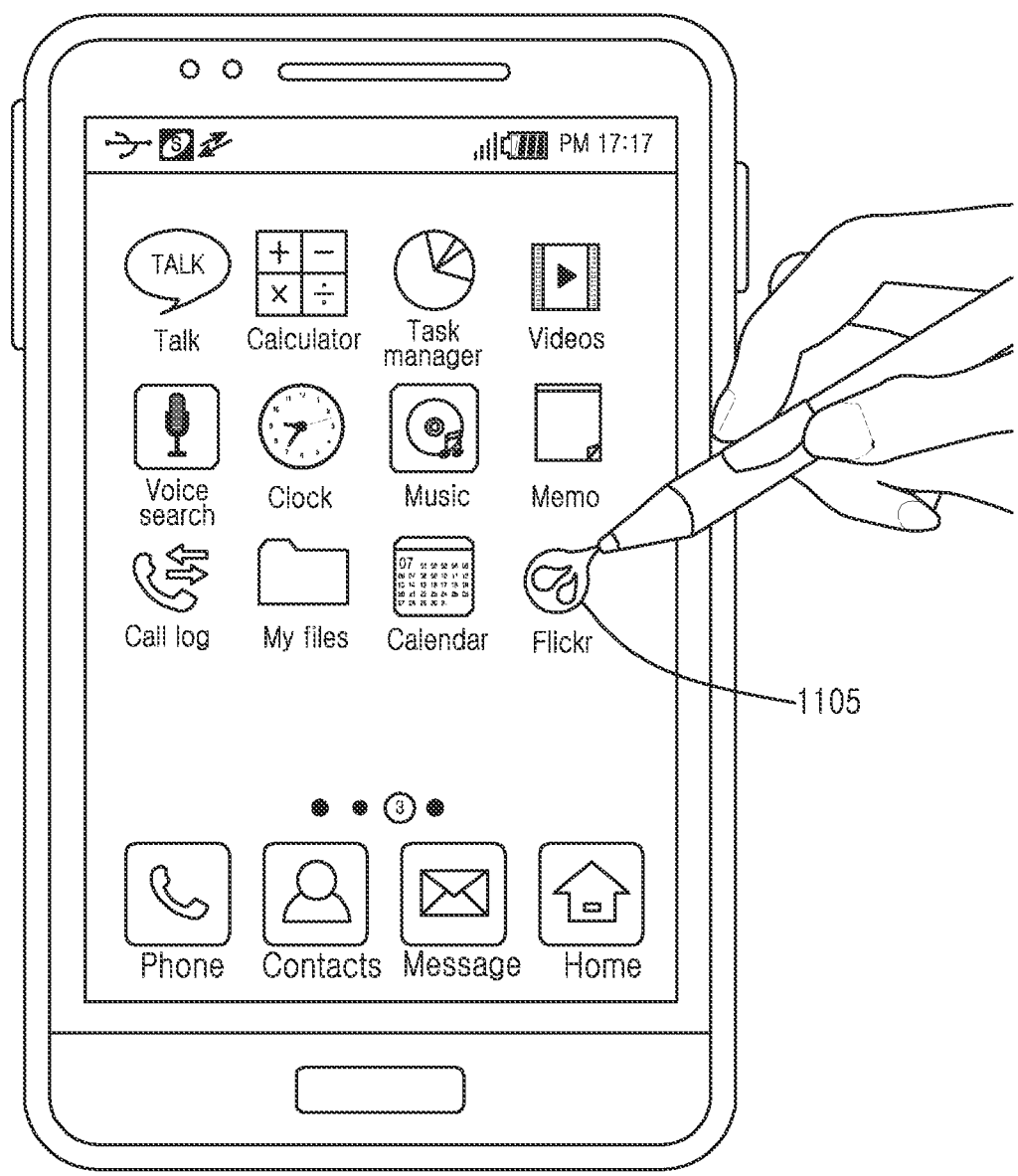
Figure 11C:
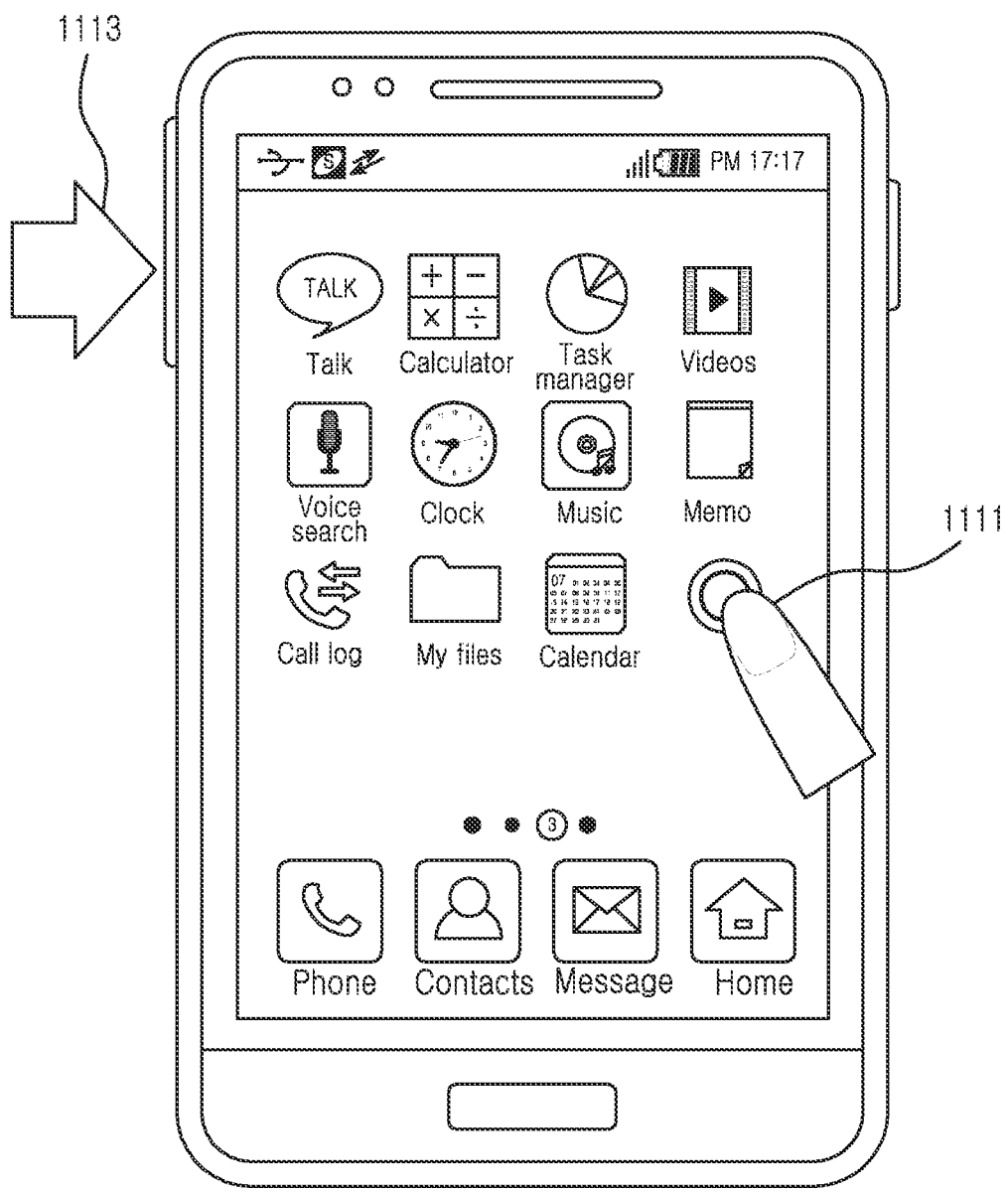
Figure 11D:
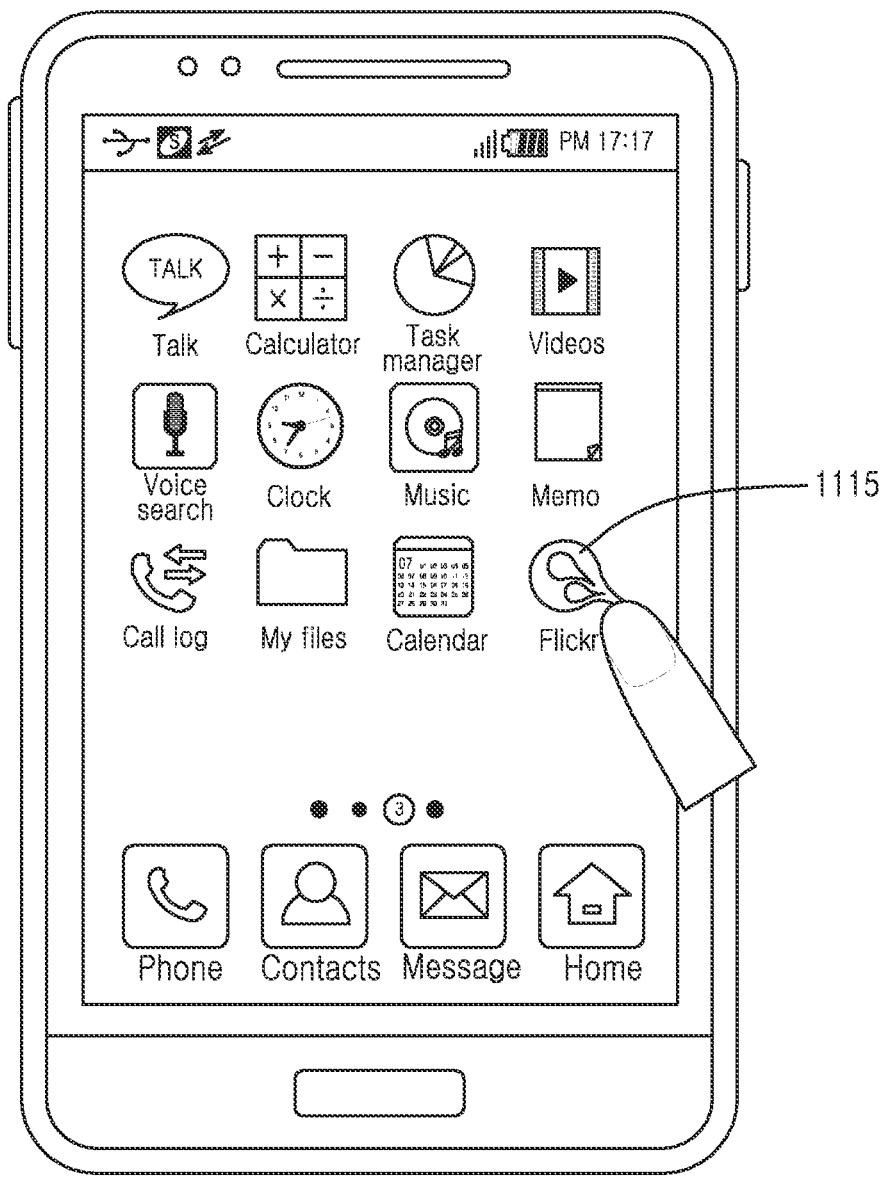

After displaying the cropping information, the electronic device proceeds to operation 605 and performs pasting of at least one cropping information according to a pasting event. For example, if pressing 1103 of a button of a touch pen is detected when a touch 1101 to a point displaying no object is held by the touch pen as illustrated in FIG. 11A, the electronic device can paste at least one object to the touch point. For example, the electronic device can paste at least one object by producing an effect 1105 in which at least one object for pasting is discharged from the touch pen similarly to an effect of squeezing liquid out of a tube as illustrated in FIG. 11B. If the cropping information displayed on the display unit 150 is plural in number, the electronic device may select at least one cropping information for pasting among the plurality of cropping information based on touch information of the touch pen. In another example, if pressing 1113 of a hardware button of the electronic device is detected when a touch 1111 to a point displaying no object is held by a finger as illustrated in FIG. 11C, the electronic device can paste at least one object to the touch point. For example, the electronic device can paste at least one object by producing an effect 1115 in which at least one object for pasting is discharged from the finger similarly to an effect of squeezing liquid out of a tube as illustrated in FIG. 11D. If the cropping information displayed on the display unit 150 is plural in number, the electronic device may select at least one cropping information for pasting among the plurality of cropping information based on touch information of the finger.

Figure 7:
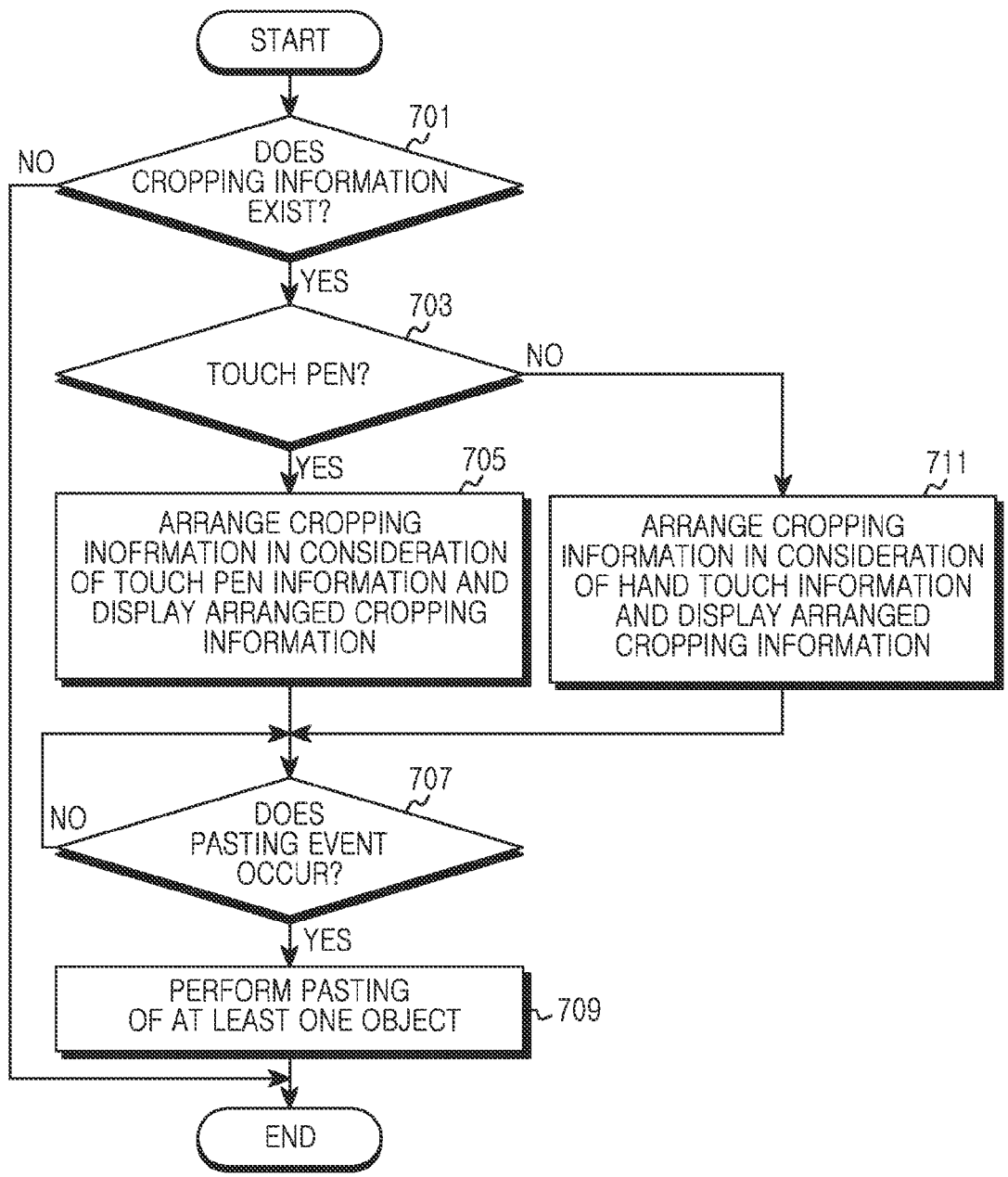
FIG. 7 is a flowchart illustrating a procedure for arranging cropping information based on a touch characteristic in an electronic device according to an embodiment of the present disclosure.

FIG. 7 is a flowchart illustrating a procedure for arranging cropping information based on a touch characteristic in an electronic device according to an embodiment of the present disclosure.

Referring to FIG. 7, in operation 701, the electronic device determines if cropping information exists. For example, the electronic device determines if cropping information stored in the data storage unit 112 exists.

If the cropping information does not exist, the electronic device recognizes that it cannot provide a cropping service. Accordingly, the electronic device terminates the algorithm of the present disclosure.

On the other hand, if at least one cropping information exists, the electronic device proceeds to operation 703 and determines a touch input method. For example, the electronic device determines whether it uses a touch input method by the touch pen.

If it is determined that the electronic device uses the touch input method by the touch pen in operation 703, the electronic device proceeds to operation 705 and arranges at least one cropping information stored in the data storage unit 112 based on the touch input method by the touch pen and displays the arranged cropping information on the display unit 150. For example, as illustrated in FIG. 9A or FIG. 9B, the electronic device can display (901 or 911) at least one cropping information stored in the data storage unit 112 using a notification bar. If an object 1 and an object 2 are cropped according to touch information of a touch pen and an object 3 is cropped according to touch information of a finger, as illustrated in FIG. 9A, the electronic device can display such that the object 1 and object 2 (903) cropped according to the touch information of the touch pen have faster priority order than the object 3 (905) cropped according to the touch information of the finger.

In another example, if pressing of a cropping information display button 1001 displayed in a partial region of the display unit 150 is detected as illustrated in FIG. 10A, the electronic device can display (1011 or 1021) at least one cropping information stored in the data storage unit 112 as illustrated in FIG. 10B or FIG. 10C. If an object 1 and an object 2 are cropped according to touch information of a touch pen and an object 3 is cropped according to touch information of a finger, as illustrated in FIG. 10B, the electronic device can display such that the object 1 and object 2 (1013) cropped according to the touch information of the touch pen have faster priority order than the object 3 (1015) cropped according to the touch information of the finger.

Thereafter, the electronic device proceeds to operation 707 and determines if a pasting event takes place. For example, the electronic device can determine if pressing of a button of a touch pen is detected when a touch to a point displaying no object is held by the touch pen. In another example, the electronic device may determine if pressing of a hardware button of the electronic device is detected when a touch to a point displaying no object is held by a finger.

On the other hand, if it is determined that the electronic device uses the touch input method by the finger in operation 703, the electronic device proceeds to operation 711 and arranges at least one cropping information stored in the data storage unit 112 based on the touch input method by the finger and displays the arranged cropping information on the display unit 150. For example, as illustrated in FIG. 9A or FIG. 9B, the electronic device can display (901 or 911) at least one cropping information stored in the data storage unit 112 using a notification bar. If an object 1 and an object 2 are cropped according to touch information of a touch pen and an object 3 is cropped according to touch information of a finger, as illustrated in FIG. 9B, the electronic device can display such that the object 3 (913) cropped according to the touch information of the finger has faster priority order than the object 1 and object 2 (915) cropped according to the touch information of the touch pen.

In another example, if pressing of a cropping information display button 1001 displayed in a partial region of the display unit 150 is detected as illustrated in FIG. 10A, the electronic device can display (1011 or 1021) at least one cropping information stored in the data storage unit 112 as illustrated in FIG. 10B or FIG. 10C. If an object 1 and an object 2 are cropped according to touch information of a touch pen and an object 3 is cropped according to touch information of a finger, as illustrated in FIG. 10C, the electronic device can display such that the object 3 (1023) cropped according to the touch information of the finger has faster priority order than the object 1 and object 2 (1025) cropped according to the touch information of the touch pen.

Thereafter, the electronic device proceeds to operation 707 and determines if a pasting event takes place. For example, the electronic device can determine if pressing of a button of a touch pen is detected when a touch to a point displaying no object is held by the touch pen. In another example, the electronic device may determine if pressing of a hardware button of the electronic device is detected when a touch to a point displaying no object is held by a finger.

If the pasting event occurs, the electronic device proceeds to operation 709 and performs pasting of at least one cropping information according to the pasting event. For example, if pressing 1103 of a button of a touch pen is detected when a touch 1101 to a point displaying no object is held by the touch pen as illustrated in FIG. 11A, the electronic device can paste at least one object to the touch point. For example, the electronic device can paste at least one object by producing an effect 1105 in which at least one object for pasting is discharged from the touch pen similarly to an effect of squeezing liquid out of a tube as illustrated in FIG. 11B. If the cropping information displayed on the display unit 150 is plural in number, the electronic device may select at least one cropping information for pasting among the plurality of cropping information based on touch information of the touch pen.

In another example, if pressing 1113 of a hardware button of the electronic device is detected when a touch 1111 to a point displaying no object is held by a finger as illustrated in FIG. 11C, the electronic device can paste at least one object to the touch point. For example, the electronic device can paste at least one object by producing an effect 1115 in which at least one object for pasting is discharged from the finger similarly to an effect of squeezing liquid out of a tube as illustrated in FIG. 11D. If the cropping information displayed on the display unit 150 is plural in number, the electronic device may select at least one cropping information for pasting among the plurality of cropping information based on touch information of the finger.

Figure 8:
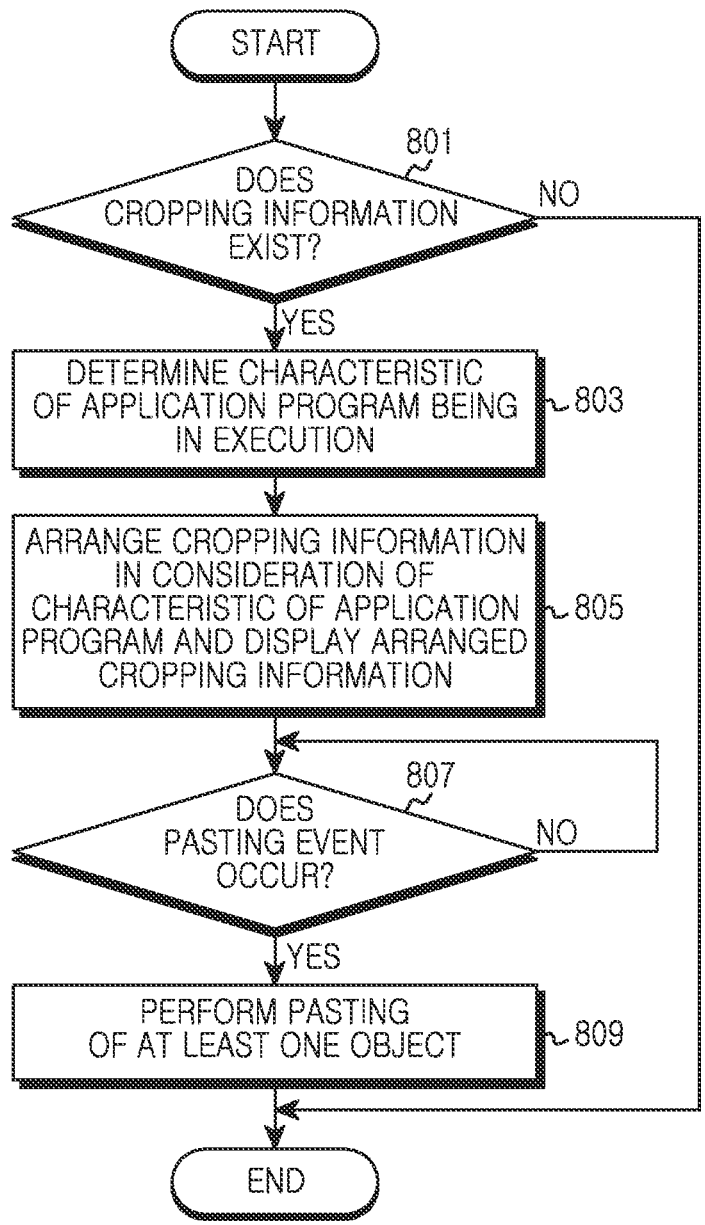
FIG. 8 is a flowchart illustrating a procedure for arranging cropping information based on an application program characteristic in an electronic device according to an embodiment of the present disclosure.

FIG. 8 is a flowchart illustrating a procedure for arranging cropping information based on an application program characteristic in an electronic device according to an embodiment of the present disclosure.

Referring to FIG. 8, in operation 801, the electronic device determines if cropping information exists. For example, the electronic device determines if cropping information stored in the data storage unit 112 exists.

If the cropping information does not exist, the electronic device recognizes that it cannot provide a pasting service. Accordingly, the electronic device terminates the algorithm of the present disclosure.

On the other hand, if at least one cropping information exists, the electronic device proceeds to operation 803 and determines a characteristic of an application program executed in the electronic device. Here, the characteristic of the application program includes at least one of a form of the application program and a service field of the application program.

The electronic device proceeds to operation 805 and arranges at least one cropping information stored in the data storage unit 112 based on the characteristic of the application program executed in the electronic device, and displays the arranged cropping information on the display unit 150.

FIGS. 9A and 9B illustrate a screen construction for displaying cropping information in an electronic device according to an embodiment of the present disclosure.

Referring to FIGS. 9A and 9B, for example, as illustrated in FIG. 9A or FIG. 9B, the electronic device can display (901 or 911) at least one cropping information stored in the data storage unit 112 using a notification bar. At this time, as illustrated in FIG. 9A or FIG. 9B, the electronic device can arrange (901 or 911) at least one cropping information according to the characteristic of the application program of the electronic device and display the arranged cropping information on the display unit 150.

FIGS. 10A, 10B, and 10C illustrate a screen construction for displaying cropping information in an electronic device according to an embodiment of the present disclosure.

Referring to FIGS. 10A, 10B, and 10C, for example, if pressing of a cropping information display button 1001 displayed in a partial region of the display unit 150 is detected as illustrated in FIG. 10A, the electronic device can display at least one cropping information stored in the data storage unit 112 as illustrated in FIG. 10B or FIG. 10C. At this time, as illustrated in FIG. 10B or FIG. 10C, the electronic device can arrange (1011 or 1021) at least one cropping information according to the characteristic of the application program of the electronic device and display the arranged cropping information on the display unit 150.

Referring back to FIG. 8, the electronic device proceeds to operation 807 and determines if a pasting event takes place. For example, the electronic device can determine if pressing of a button of a touch pen is detected when a touch to a point displaying no object is held by the touch pen. In another example, the electronic device may determine if pressing of a hardware button of the electronic device is detected when a touch to a point displaying no object is held by a finger.

If the pasting event takes place, the electronic device proceeds to operation 809 and performs pasting of at least one cropping information according to the pasting event.

FIGS. 11A, 11B, 11C, and 11D illustrate a screen construction for providing a pasting service in an electronic device according to an embodiment of the present disclosure.

Referring to FIGS. 11A, 11B, 11C, and 11D, for example, if pressing 1103 of a button of a touch pen is detected when a touch 1101 to a point displaying no object is held by the touch pen as illustrated in FIG. 11A, the electronic device can paste at least one object to the touch point. For example, the electronic device can paste at least one object by producing an effect 1105 in which at least one object for pasting is discharged from the touch pen similarly to an effect of squeezing liquid out of a tube as illustrated in FIG. 11B. If the cropping information displayed on the display unit 150 is plural in number, the electronic device may select at least one cropping information for pasting among the plurality of cropping information based on touch information of the touch pen.

In another example, if pressing 1113 of a hardware button of the electronic device is detected when a touch 1111 to a point displaying no object is held by a finger as illustrated in FIG. 11C, the electronic device can paste at least one object to the touch point. For example, the electronic device can paste at least one object by producing an effect 1115 in which at least one object for pasting is discharged from the finger similarly to an effect of squeezing liquid out of a tube as illustrated in FIG. 11D. If the cropping information displayed on the display unit 150 is plural in number, the electronic device may select at least one cropping information for pasting among the plurality of cropping information based on touch information of the finger.

The following description is made for a way for sharing cropping information between electronic devices.

FIG. 12 is a ladder diagram illustrating a procedure for sharing cropping information according to an embodiment of the present disclosure.

Referring to FIG. 12, a first electronic device 1200 and a second electronic device 1210 set up a communication link through a short-range communication network in operation 1211. Here, the short-range communication network includes at least one of Wireless Fidelity (WiFi) direct, WLAN, ZigBee, Infrared Data Association (IrDA), and the like.

If a pasting event occurs in the second electronic device 1210 in operation 1213, the second electronic device 1210 transmits a cropping information request signal to the first electronic device 1200 in operation 1215. For example, if pressing of a button of a touch pen is detected when a touch to a point displaying no object is held by the touch pen, the second electronic device 1210 can recognize that the pasting event occurs. In another example, if pressing of a hardware button of the second electronic device 1210 is detected when a touch to a point displaying no object is held by the finger, the second electronic device 1210 can recognize that the pasting event occurs. In another example, if selection of a pasting icon is detected, the second electronic device 1210 may recognize that the pasting event occurs. In another example, if selection of a pasting menu is detected, the second electronic device 1210 may recognize that the pasting event occurs.

In response to the cropping information request of the second electronic device 1210, the first electronic device 1200 transmits cropping information stored in a data storage unit 112 of the first electronic device 1200, to the second electronic device 1210 in operation 1217. At this time, the first electronic device 1200 can transmit cropping information together with service status information about each cropping information.

Thereafter, the second electronic device 1210 arranges at least one cropping information received from the first electronic device 1200 based on a service characteristic of the second electronic device 1210 and displays the arranged cropping information on the display unit 150 in operation 1219.

Thereafter, the second electronic device 1210 performs pasting of the at least one cropping information in operation 1221. For example, if the second electronic device 1210 detects the occurrence of the pasting event based on touch information 1101 of a touch pen and pressing 1103 of a button of the touch pen as illustrated in FIG. 11A in operation 1213, the second electronic device 1210 can paste to a touch point 1101 at least one object received from the first electronic device 1200. For example, the second electronic device 1210 can paste at least one object by producing an effect 1105 in which at least one object for pasting is discharged from the touch pen similarly to an effect of squeezing liquid out of a tube as illustrated in FIG. 11B. Additionally, if a plurality of cropping information is received from the first electronic device 1200, the second electronic device 1210 may select at least one cropping information for pasting among the plurality of cropping information based on touch information of the touch pen.

In another example, if the second electronic device 1210 detects the occurrence of the pasting event based on touch information 1111 of a finger and pressing 1113 of a hardware button of the second electronic device 1210 as illustrated in FIG. 11C in operation 1213, the second electronic device 1210 can paste to a touch point 1111 at least one object received from the first electronic device 1200. For example, the second electronic device 1210 can paste at least one object by producing an effect 1115 in which at least one object for pasting is discharged from the finger similarly to an effect of squeezing liquid out of a tube as illustrated in FIG. 11D. Additionally, if a plurality of cropping information is received from the first electronic device 1200, the second electronic device 1210 may select at least one cropping information for pasting among the plurality of cropping information based on touch information of the finger.

In the aforementioned embodiment of the present disclosure, the first electronic device 1200 transmits cropping information stored in the data storage unit 112 of the first electronic device 1200, to the second electronic device 1210, in response to the cropping information request of the second electronic device 1210 in operation 1217. On the other hand, if the cropping information stored in the data storage unit 112 of the first electronic device 1200 does not exist, the first electronic device 1200 can notify the absence of the cropping information to the second electronic device 1210.

Figure 13:
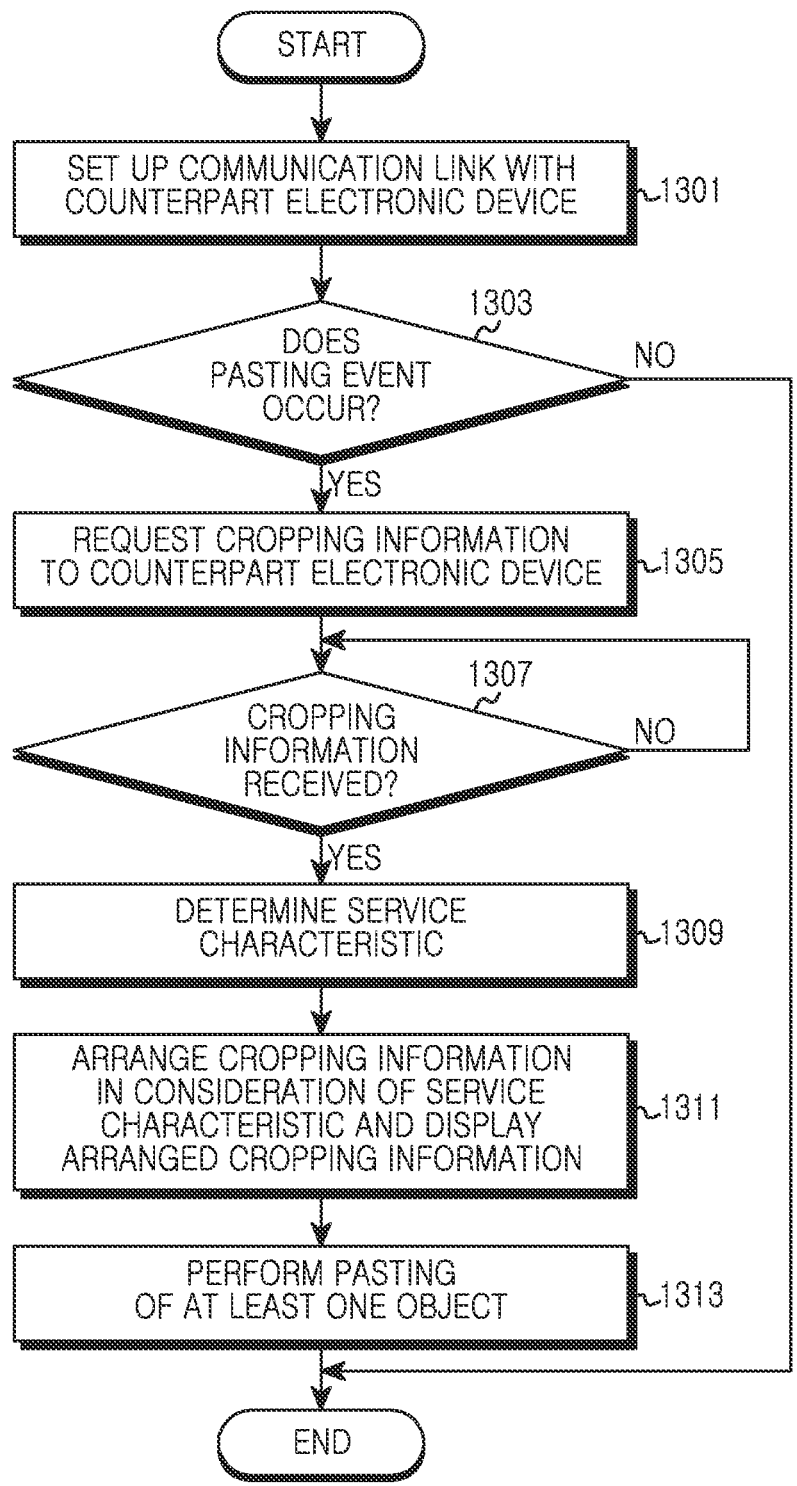
FIG. 13 is a flowchart illustrating a procedure for sharing cropping information with a counterpart electronic device in an electronic device according to an embodiment of the present disclosure.

FIG. 13 is a flowchart illustrating a procedure for sharing cropping information with a counterpart electronic device in an electronic device according to an embodiment of the present disclosure.

Referring to FIG. 13, in operation 1301, the electronic device sets up a communication link with a counterpart electronic device through a short-range communication network.

Thereafter, the electronic device proceeds to operation 1303 and determines if a pasting event takes place. For example, if pressing of a button of a touch pen is detected when a touch to a point displaying no object is held by the touch pen, the electronic device can recognize that the pasting event occurs. In another example, if pressing of a hardware button of the electronic device is detected when a touch to a point displaying no object is held by a finger, the electronic device can recognize that the pasting event occurs. In another example, if selection of a pasting icon is detected, the electronic device may recognize that the pasting event occurs. In another example, if selection of a pasting menu is detected, the electronic device may recognize that the pasting event occurs.

If the pasting event occurs, the electronic device proceeds to operation 1305 and transmits a cropping information request signal to the counterpart electronic device with which the communication link has been set up.

Thereafter, the electronic device proceeds to operation 1307 and determines if cropping information is received from the counterpart electronic device. Although not illustrated, if information indicating the absence of the cropping information is received from the counterpart electronic device, the electronic device can terminate the algorithm of the present disclosure.

If it is determined that the cropping information is received from the counterpart electronic device in operation 1307, the electronic device proceeds to operation 1309 and determines a service characteristic of the electronic device.

At this time, the cropping information received from the counterpart electronic device includes service status information about each cropping information. Here, the service characteristic includes at least one of a touch input method of the electronic device, a characteristic of an application program being in execution, a characteristic of a user interface displayed on the display unit 150, and the like.

After determining the service characteristic of the electronic device, the electronic device proceeds to operation 1311 and arranges at least one cropping information received from the counterpart electronic device according to the service characteristic of the electronic device and displays the arranged cropping information on the display unit 150. Thereafter, the electronic device proceeds to operation 1313 and performs pasting of the at least one cropping information. For example, if the electronic device detects the occurrence of the pasting event based on touch information 1101 of a touch pen and pressing 1103 of a button of the touch pen as illustrated in FIG. 11A in operation 1303, the electronic device can paste to a touch point 1101 at least one object received from the counterpart electronic device. Additionally, if a plurality of cropping information is received from the counterpart electronic device, the electronic device may select at least one cropping information for pasting among the plurality of cropping information based on touch information of the touch pen.

In another example, if the electronic device detects the occurrence of the pasting event based on touch information 1111 of a finger and pressing 1113 of a hardware button of the electronic device as illustrated in FIG. 11C in operation 1303, the electronic device can paste to a touch point 1111 at least one object received from the counterpart electronic device. Additionally, if a plurality of cropping information is received from the counterpart electronic device, the electronic device may select at least one cropping information for pasting among the plurality of cropping information based on touch information of the finger.

In the aforementioned embodiment of the present disclosure, the electronic device performs the pasting using the cropping information received from the counterpart electronic device.

In another embodiment of the present disclosure, the electronic device can perform the pasting using the cropping information received from the counterpart electronic device and the cropping information stored in the data storage unit 112 of the electronic device together. For example, the electronic device can arrange the cropping information received from the counterpart electronic device and the cropping information stored in the data storage unit 112 of the electronic device, according to the service characteristic of the electronic device, and display the arranged cropping information on the display unit 150. In another example, if information indicating the absence of the cropping information is received from the counterpart electronic device, the electronic device can arrange the cropping information stored in the data storage unit 112 according to the service characteristic of the electronic device and display the arranged cropping information on the display unit 150.

FIG. 14 is a ladder diagram illustrating a procedure for sharing cropping information according to an embodiment of the present disclosure.

Referring to FIG. 14, if a cropping event takes place, a first electronic device 1400 performs cropping of at least one display information in operation 1431. For example, if pressing 403 of a button of a touch pen is detected when a touch 401 to a first object is held by the touch pen as illustrated in FIG. 4A, the first electronic device 1400 can crop the first object by producing an animation editing effect 405 in which the first object is sucked into the touch pen as illustrated in FIG. 4B. If pressing 505 of the button of the touch pen is detected when a touch 503 to an object (e.g., "Flickr") included in an object group 501 is held by the touch pen as illustrated in FIG. 5B, the first electronic device 1400 may crop objects included in the object group 501 by producing an animation editing effect 507 of as if the objects included in the object group 501 are sucked into the touch pen as illustrated in FIG. 5C.

In another example, if pressing 413 of a hardware button of the first electronic device 1400 is detected when a touch 411 to a first object is held by a user's finger as illustrated in FIG. 4C, the first electronic device 1400 can crop the first object by producing an animation editing effect 415 in which the first object is sucked into the finger as illustrated in FIG. 4D. If pressing 515 of a hardware button of the first electronic device 1400 is detected when a touch 513 to an object (e.g., "Flickr") included in the object group 511 is held by the finger as illustrated in FIG. 5E, the first electronic device 1400 may crop objects included in the object group 511 by producing an animation editing effect 517 of as if the objects included in the object group 511 are sucked into the finger as illustrated in FIG. 5F.

Thereafter, the first electronic device 1400 transmits cropping information and service status information of a cropping time point to a server 1410 in operation 1433. In this case, the server 1410 stores in a data storage unit of the server 1410 the cropping information and the service status information of the cropping time point that are received from the first electronic device 1400.

If a pasting event takes place in a second electronic device 1420 in operation 1435, the second electronic device 1420 transmits a cropping information request signal to the server 1410 in operation 1437. For example, if pressing of a button of a touch pen is detected when a touch to a point displaying no object is held by the touch pen, the second electronic device 1420 can recognize that the pasting event occurs. In another example, if pressing of a hardware button of the second electronic device 1420 is detected when a touch to a point displaying no object is held by a finger, the second electronic device 1420 can recognize that the pasting event occurs. In another example, if selection of a pasting icon is detected, the second electronic device 1420 may recognize that the pasting event occurs. In another example, if selection of a pasting menu is detected, the second electronic device 1420 may recognize that the pasting event occurs.

In response to the cropping information request of the second electronic device 1420, the server 1410 transmits the cropping information received from the first electronic device 1400, to the second electronic device 1420 in operation 1439. For example, in response to the cropping information request of the second electronic device 1420, the server 1410 transmits the cropping information stored in the data storage unit of the server 1410, to the second electronic device 1420. At this time, the server 1410 can transmit cropping information together with service status information about each cropping information.

The second electronic device 1420 arranges at least one cropping information received from the server 1410 based on a service characteristic of the second electronic device 1420 and displays the arranged cropping information on the display unit 150 in operation 1441.

Thereafter, the second electronic device 1420 performs pasting of the at least one cropping information in operation 1443. For example, if the second electronic device 1420 detects the occurrence of the pasting event based on touch information 1101 of a touch pen and pressing 1103 of a button of the touch pen as illustrated in FIG. 11A in operation 1435, the second electronic device 1420 can paste to a touch point 1101 at least one object received from the server 1410. For example, the second electronic device 1420 can paste at least one object by producing an effect 1105 in which at least one object for pasting is discharged from the touch pen similarly to an effect of squeezing liquid out of a tube as illustrated in FIG. 11B. Additionally, if a plurality of cropping information is received from the server 1410, the second electronic device 1420 may select at least one cropping information for pasting among the plurality of cropping information based on touch information of the touch pen.

In another example, if the second electronic device 1420 detects the occurrence of the pasting event based on touch information 1111 of a finger and pressing 1113 of a hardware button of the second electronic device 1420 as illustrated in FIG. 11C in operation 1435, the second electronic device 1420 can paste to a touch point 1111 at least one object received from the server 1410. For example, the second electronic device 1420 can paste at least one object by producing an effect 1115 in which at least one object for pasting is discharged from the finger similarly to an effect of squeezing liquid out of a tube as illustrated in FIG. 11D. Additionally, if a plurality of cropping information is received from the server 1410, the second electronic device 1420 may select at least one cropping information for pasting among the plurality of cropping information based on touch information of the finger.

In the aforementioned embodiment of the present disclosure, the server 1410 transmits cropping information stored in the data storage unit of the server 1410, to the second electronic device 1420, in response to the cropping information request of the second electronic device 1420 in operation 1439. On the other hand, if the cropping information stored in the data storage unit of the server 1410 does not exist, the server 1410 can notify the absence of the cropping information to the second electronic device 1420.

In the aforementioned embodiment of the present disclosure, the first electronic device 1400 transmits cropping information and service status information to the server 1410.

Figure 15:
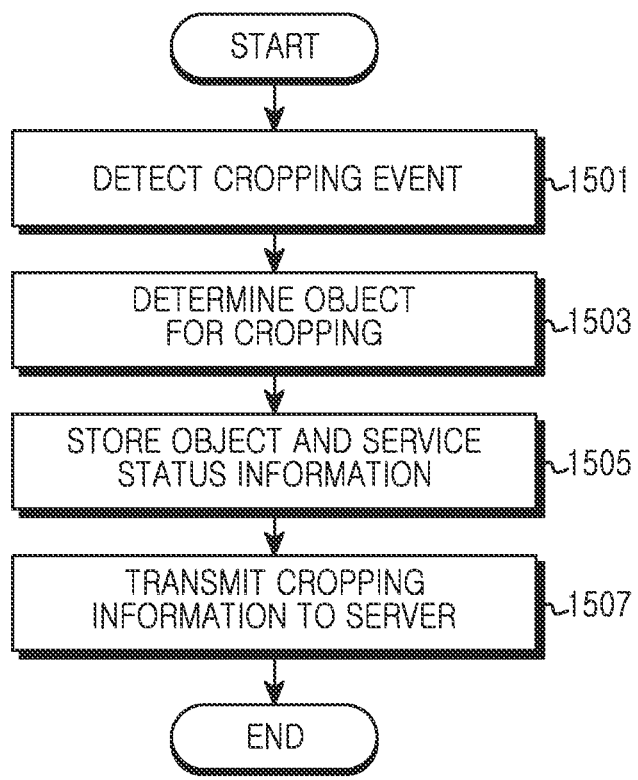
FIG. 15 is a flowchart illustrating a procedure for transmitting cropping information in an electronic device according to an embodiment of the present disclosure.

In another embodiment of the present disclosure, the first electronic device 1400 may store the cropping information and the service status information as illustrated in FIG. 15 below.

FIG. 15 is a flowchart illustrating a procedure for transmitting cropping information in an electronic device according to an embodiment of the present disclosure.

Referring to FIG. 15, if the electronic device detects a cropping event in operation 1501, the electronic device proceeds to operation 1503 and determines at least one object for cropping. For example, if pressing 403 of a button of a touch pen is detected when a touch 401 to a first object is held by the touch pen as illustrated in FIG. 4A, the electronic device can recognize that the cropping event occurs. At this time, the electronic device can recognize the first object touched by the touch pen as the object for cropping. In another example, if pressing 413 of a hardware button of the electronic device is detected when a touch 411 to a first object is held by a user's finger as illustrated in FIG. 4C, the electronic device can recognize that the cropping event occurs. At this time, the electronic device can recognize the first object touched by the finger as the object for cropping.

After determining the object for cropping, the electronic device proceeds to operation 1505 and crops the at least one object determined in operation 1503 and stores the at least one cropped object together with service status information. For example, the electronic device can store object information and service status information of a cropping service provision time point added to the object information, in the data storage unit 112. In another example, the electronic device may store metadata which includes cropped object information and service status information about an object, in the data storage unit 112. For example, the electronic device may store a service status information table which includes at least one object cropped through a cropping service and service status information of an object cropping time point, in the data storage unit 112.

After storing the cropping information, the electronic device proceeds to operation 1507 and transmits the cropping information and the service status information to a server.

In the aforementioned embodiment of the present disclosure, after storing the cropping information in operation 1505, the electronic device transmits the cropping information to the server in operation 1507.

In another embodiment of the present disclosure, the electronic device may perform storing and transmitting of the cropping information in parallel. For example, after cropping at least one object, the electronic device may perform storing and transmitting of the cropped object in parallel.

Figure 16:
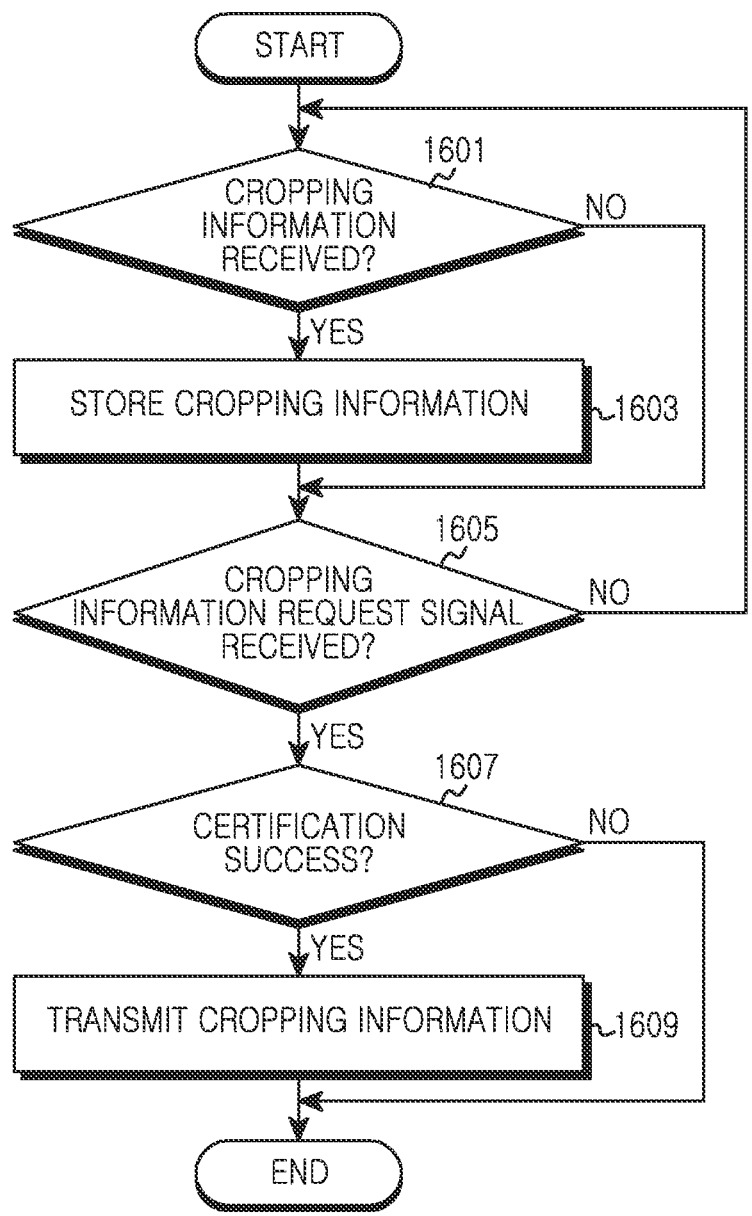
FIG. 16 is a flowchart illustrating a procedure for transmitting cropping information in a server according to an embodiment of the present disclosure.

FIG. 16 is a flowchart illustrating a procedure for transmitting cropping information in a server according to an embodiment of the present disclosure.

Referring to FIG. 16, in operation 1601, the server determines if cropping information is received from at least one first electronic device.

If it is determined in operation 1601 that the cropping information is not received from the at least one first electronic device, the server jumps to operation 1605 and determines if a cropping information request signal is received from at least one second electronic device.

On the other hand, if it is determined in operation 1601 that the cropping information is received from the at least one first electronic device in operation 1601, the server proceeds to operation 1603 and stores the cropping information received from the at least one first electronic device. At this time, the server can store the cropping information received from the at least one first electronic device, together with service status information about each cropping information. For example, the server can store object information and service status information of a cropping service provision time point added to the object information, in a data storage unit of the server. In another example, the server may store metadata which includes cropped object information and service status information about an object, in the data storage unit of the server. For example, the server may store a service status information table which includes at least one object cropped through a cropping service and service status information of an object cropping time point, in the data storage unit of the server.

Thereafter, the server proceeds to operation 1605 and determines if a cropping information request signal is received from the at least one second electronic device.

If is determined that the cropping information request signal is not received from the at least one second electronic device in operation 1605, the server returns to operation 1601 and determines if cropping information is received from the at least one second electronic device.

On the other hand, if is determined that the cropping information request signal is received from the at least one second electronic device in operation 1605, the server proceeds to operation 1607 and determines the certification or non-certification of the second electronic device.

If the server is not able to certify the second electronic device, the server recognizes that it cannot transmit the cropping information to the second electronic device. Accordingly, the server terminates the algorithm of the present disclosure.

On the other hand, if the server has certified the second electronic device, the server proceeds to operation 1609 and transmits the cropping information stored in the server, to the second electronic device. At this time, the server transmits service status information about each cropping information, together.

As described above, if the cropping information request signal is received from the second electronic device, the server transmits the cropping information to the second electronic device depending on the certification or non-certification of the second electronic device.

Additionally, if the cropping information request signal is received from the second electronic device, the server may determine the existence or non-existence of cropping information to be transmitted to the second electronic device. If the cropping information to be transmitted to the second electronic device exists, the server transmits the cropping information to the second electronic device depending on the certification or non-certification of the second electronic device. On the other hand, if the cropping information to be transmitted to the second electronic device does not exist, the server may transmit the absence of the cropping information to the second electronic device.

Figure 17:
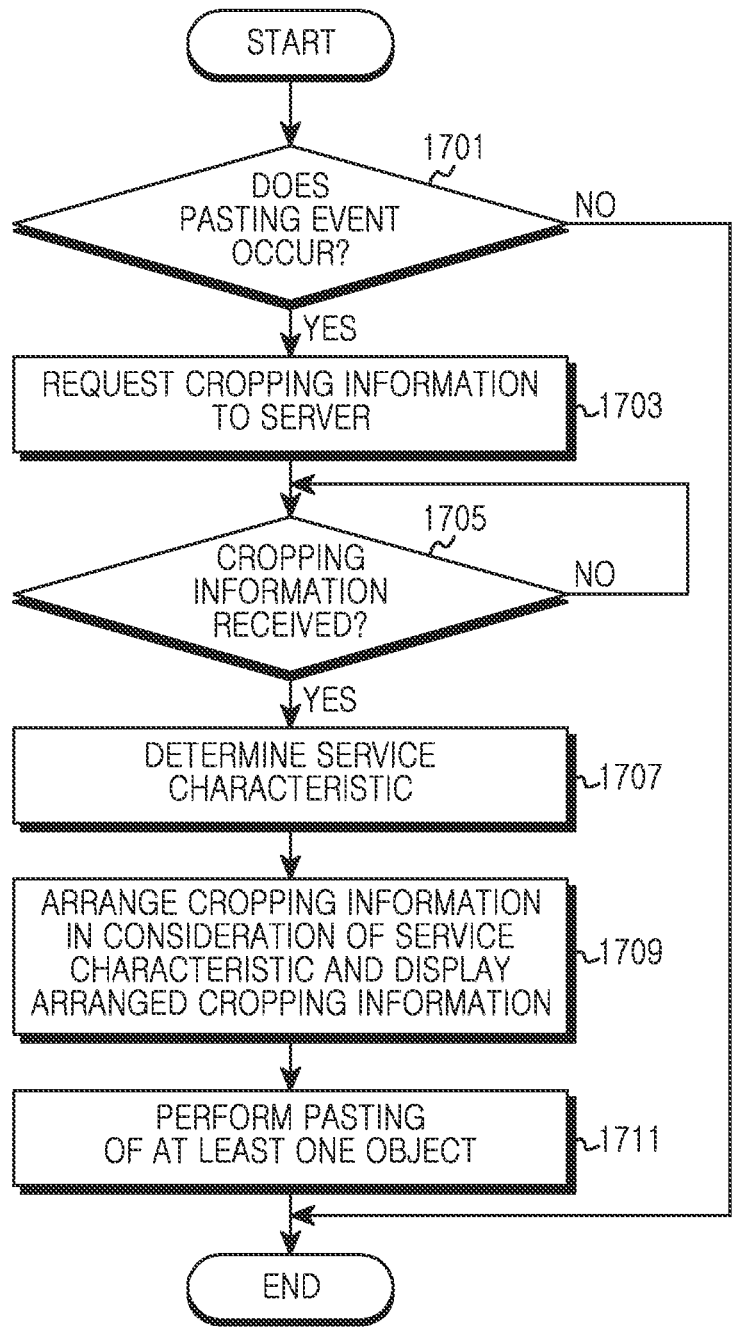
FIG. 17 is a flowchart illustrating a procedure for sharing cropping information with a counterpart electronic device in an electronic device according to an embodiment of the present disclosure.

FIG. 17 is a flowchart illustrating a procedure for sharing cropping information with a counterpart electronic device in an electronic device according to an embodiment of the present disclosure.

Referring to FIG. 17, in operation 1701, the electronic device determines if a pasting event takes place. For example, if pressing of a button of a touch pen is detected when a touch to a point displaying no object is held by the touch pen, the electronic device can recognize that the pasting event occurs. In another example, if pressing of a hardware button of the electronic device is detected when a touch to a point displaying no object is held by a finger, the electronic device can recognize that the pasting event occurs. In another example, if selection of a pasting icon is detected, the electronic device may recognize that the pasting event occurs. In another example, if selection of a pasting menu is detected, the electronic device may recognize that the pasting event occurs.

If it is determined in operation 1701 that the pasting event occurs, the electronic device proceeds to operation 1703 and transmits a cropping information request signal to a server.

The electronic device proceeds to operation 1705 and determines if cropping information is received from the server. Although not illustrated, if information indicating the absence of the cropping information is received from the server, the electronic device can terminate the algorithm of the present disclosure.

If it is determined in operation 1705 that the cropping information is received from the server, the electronic device proceeds to operation 1707 and determines a service characteristic of the electronic device. At this time, the cropping information received from the server includes service status information about each cropping information. Here, the service characteristic includes at least one of a touch input method of the electronic device, a characteristic of an application program being in execution, a characteristic of a user interface displayed on the display unit 150, and the like.

After determining the service characteristic of the electronic device, the electronic device proceeds to operation 1709 and arranges at least one cropping information received from the server according to the service characteristic of the electronic device and displays the arranged cropping information on the display unit 150.

Thereafter, the electronic device proceeds to operation 1711 and performs pasting of the at least one cropping information. For example, if the electronic device detects the occurrence of the pasting event based on touch information 1101 of a touch pen and pressing 1103 of a button of the touch pen as illustrated in FIG. 11A in operation 1701, the electronic device can paste to a touch point 1101 at least one object received from the server. Additionally, if a plurality of cropping information is received from the server, the electronic device may select at least one cropping information for pasting among the plurality of cropping information based on touch information of the touch pen.

In another example, if the electronic device detects the occurrence of the pasting event based on touch information 1111 of a finger and pressing 1113 of a hardware button of the electronic device as illustrated in FIG. 11C in operation 1701, the electronic device can paste to a touch point 1111 at least one object received from the server. Additionally, if a plurality of cropping information is received from the server, the electronic device may select at least one cropping information for pasting among the plurality of cropping information based on touch information of the finger.

In the aforementioned embodiment of the present disclosure, the electronic device performs the pasting using the cropping information received from the server.

In another embodiment of the present disclosure, the electronic device can perform the pasting using the cropping information received from the server and the cropping information stored in the data storage unit 112 of the electronic device together. For example, the electronic device can arrange the cropping information received from the server and the cropping information stored in the data storage unit 112 of the electronic device, according to the service characteristic of the electronic device, and display the arranged cropping information on the display unit 150. In another example, if information indicating the absence of the cropping information is received from the server, the electronic device can arrange the cropping information stored in the data storage unit 112 according to the service characteristic of the electronic device and display the arranged cropping information on the display unit 150.

In the aforementioned embodiment of the present disclosure, if pressing of the button of the touch pen or pressing of the hardware button of the electronic device is detected when a touch to a point displaying no object is held by the touch pen or the finger, the electronic device performs pasting of at least one object.

In another embodiment of the present disclosure, if a touch to a point displaying no object by a touch pen or the finger is detected in an object editing mode, the electronic device may perform pasting of at least one object.

As described above, various embodiments of the present disclosure arrange cropping information based on cropping characteristic information and service characteristic information, thereby enabling a user to easily determine the cropping information dependent on the service characteristic information in an electronic device.

The various embodiments of the present disclosure can edit display information according to an editing method, thereby inducing a user's interest in the editing of the display information in an electronic device.

The various embodiments of the present disclosure provide a cropping service using cropping information of a counterpart electronic device, thereby enabling a user using many electronic devices to easily edit display information in an electronic device.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for editing an object in an electronic device, the method comprising:
 displaying at least one object;
 determining the at least one displayed object based on a touch input;
 detecting an editing event based on another input while the touch input is held on a point of the touch input;

producing a graphic effect in which the at least one determined object is sucked into the point of the touch input;

storing the at least one determined object and information regarding a type of the touch input, wherein the type of the touch input corresponds to one of an input by a touch pen or an input by a finger; and displaying, according to a priority order, a list of objects including the at least one object determined for being edited, wherein the priority order is determined based on types of touch inputs stored with the list of objects and a type of a current touch input at a time the list is displayed.

2. The method of claim 1, wherein the storing of the at least one determined object comprises storing information on a service status of the electronic device together with the at least one determined object, and wherein the information on the service status comprises at least one of a touch input method, a form of an application program executed in the electronic device, and a form of a user interface displaying the at least one object.

3. The method of claim 1, wherein the other input occurs by pressing a button of the electronic device.

4. The method of claim 2, further comprising:
transmitting the at least one stored object and information on the service status to a server.

5. The method of claim 2, further comprising:
receiving an object request signal from a second electronic device; and
transmitting the at least one stored object and information on the service status to the second electronic device.

6. A method for editing an object in an electronic device, the method comprising:
displaying, according to a priority order, a list of objects determined for being edited;
determining a point of a touch input;
detecting an editing event based on another input while the touch input is held on the point;
producing a graphic effect in which at least one object selected among the list of objects is squeezed from the point of the touch input; and
displaying the at least one object,
wherein the priority order is determined based on types of touch inputs stored with the list of objects and a type of a current touch input at a time the list is displayed, and
wherein each of the types of touch inputs corresponds to one of an input by a touch pen or an input by a finger.

7. The method of claim 6,
wherein the displaying of the at least one object comprises arranging the at least one object according to information on a service status of the electronic device, and
wherein the information on the service status comprises at least one of a touch input method, a form of an application program executed in the electronic device, and a form of a user interface displaying the at least one object.

8. The method of claim 6, wherein the other input occurs by pressing a button of the electronic device.

9. The method of claim 6, wherein the at least one object is received from a counterpart electronic device.

10. An electronic device comprising:
a touch screen configured to detect a presence and a location of a touch input;
at least one processor configured to execute computer programs; and
a memory configured to store data, instructions, and a program driven by the at least one processor,
wherein the at least one processor is further configured to:
display at least one object,
determine the at least one displayed object based on a touch input,
detect an editing event based on another input while the touch input is held on a point of the touch input,
produce a graphic effect in which the determined at least one object is sucked into the point of the touch input,
store the determined at least one object and information regarding a type of the touch input, wherein the type of the touch input corresponds to one of an input by a touch pen or an input by a finger, and
display, according to a priority order, a list of objects including the at least one object determined for being edited,
wherein the priority order is determined based on types of touch inputs stored with the list of objects and a type of a current touch input at a time the list is displayed.

11. The device of claim 10,
wherein the at least one processor is further configured to store information on a service status of the electronic device together with the at least one determined object, and
wherein the information on the service status comprises at least one of a touch input method, a form of an application program executed in the electronic device, and a form of a user interface displayed on the touch screen.

12. The device of claim 10, wherein the other input occurs by pressing a button of the electronic device.

13. The device of claim 11, wherein the at least one processor is further configured to transmit the at least one stored object and information on the service status to a server.

14. The device of claim 11, wherein the at least one processor is further configured to:
receive an object request signal from a second electronic device, and
transmit the stored object and information on the service status to the second electronic device.

15. An electronic device comprising:
a touch screen configured to detect a presence and a location of a touch input;
at least one processor configured to execute computer programs; and
a memory configured to store data, instructions, and a program driven by the at least one processor,
wherein the at least one processor is further configured to:
control the touch screen to display, according to a priority order, a list of objects determined for being edited,
determine a point of a touch input,
detect an editing event based on another input while the touch input is held on the point,
produce a graphic effect in which at least one object selected among the list of objects is squeezed from the point of the touch input, and
control the touch screen to display the at least one object,
wherein the priority order is determined based on types of touch inputs stored with the list of objects and a type of a current touch input at a time the list is displayed, and wherein each of the types of touch inputs corresponds to one of an input by a touch pen or an input by a finger.

16. The device of claim 15,
wherein the at least one processor is further configured to arrange the at least one object according to information on a service status of the electronic device, and
wherein the information on the service status comprises at least one of a touch input method, a form of an application program executed in the electronic device, and a form of a user interface displayed on the touch screen.

17. The device of claim 15, wherein the other input occurs by pressing a button of the electronic device.

18. The device of claim 15, wherein the at least one processor is further configured to receive the at least one object from a counterpart electronic device.

19. The method of claim 1, wherein the displaying of the list of objects comprises:
determining a type of the current touch input at a time the list of objects is displayed;
displaying, if the current touch input is the input by the touch pen, the list of objects in which a first object determined by the touch pen is displayed with higher priority than a second object determined by the finger; and
displaying, if the current touch input is the input by the finger, the list of objects in which a first object determined by the touch pen is displayed with lower priority than a second object determined by the finger.

20. The method of claim 6, wherein the displaying of the list of objects comprises:
determining a type of the current touch input at a time the list of objects is displayed;
displaying, if the current touch input is the input by the touch pen, the list of objects in which a first object determined by the touch pen is displayed with higher priority than a second object determined by the finger; and
displaying, if the current touch input is the input by the finger, the list of objects in which a first object determined by the touch pen is displayed with lower priority than a second object determined by the finger.

21. The device of claim 10, wherein the at least one processor is further configured to:
determine a type of the current touch input at a time the list of objects is displayed,
control, if the current touch input is the input by the touch pen, the touch screen to display the list of objects in which a first object determined by the touch pen is displayed with higher priority than a second object determined by the finger, and
control, if the current touch input is the input by the finger, the touch screen to display the list of objects in which a first object determined by the touch pen is displayed with lower priority than a second object determined by the finger.

22. The device of claim 15, wherein the at least one processor is further configured to:
determine a type of the current touch input at a time the list of objects is displayed,
control, if the current touch input is the input by the touch pen, the touch screen to display the list of objects in which a first object determined by the touch pen is displayed with higher priority than a second object determined by the finger, and
control, if the current touch input is the input by the finger, the touch screen to display the list of objects in which a first object determined by the touch pen is displayed with lower priority than a second object determined by the finger.

* * * * *